(12) United States Patent
Jothipandian et al.

(10) Patent No.: US 11,455,618 B2
(45) Date of Patent: Sep. 27, 2022

(54) METHOD AND SYSTEM FOR FACILITATING TRANSACTION CARD PROCUREMENT

(71) Applicant: MASTERCARD INTERNATIONAL INCORPORATED, Purchase, NY (US)

(72) Inventors: Vignesh Jothipandian, Pune (IN); Sandhya Nair, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/174,495

(22) Filed: Feb. 12, 2021

(65) Prior Publication Data
US 2021/0256501 A1    Aug. 19, 2021

(30) Foreign Application Priority Data
Feb. 14, 2020    (IN) .............................. 202021006530

(51) Int. Cl.
*G06Q 20/22* (2012.01)
*G06Q 20/34* (2012.01)
*G06Q 20/40* (2012.01)

(52) U.S. Cl.
CPC ........... *G06Q 20/34* (2013.01); *G06Q 20/354* (2013.01); *G06Q 20/401* (2013.01)

(58) Field of Classification Search
CPC .... G06Q 20/34; G06Q 20/354; G06Q 20/401; G06Q 20/2295

USPC .......................................................... 705/39
See application file for complete search history.

(56) References Cited

U.S. PATENT DOCUMENTS

| | | | |
|---|---|---|---|
| 8,024,272 B2* | 9/2011 | Doran | G07F 9/08 705/41 |
| 8,505,814 B1* | 8/2013 | Block | G07F 19/207 235/379 |
| 2007/0272743 A1* | 11/2007 | Christie | G06Q 20/354 235/381 |

* cited by examiner

*Primary Examiner* — Clifford B Madamba
(74) *Attorney, Agent, or Firm* — Harness, Dickey & Pierce, P.L.C.

(57) ABSTRACT

A method for facilitating transaction card procurement includes receiving, by a server, a card procurement request for procuring a new transaction card. The card procurement request is initiated by way of a user device of a user and includes an identifier of a transaction card dispenser selected for procurement of the new transaction card. The server communicates a card dispensing request to the transaction card dispenser for confirming an availability of the first transaction card dispenser. The server receives, from the transaction card dispenser, an approval for the card dispensing request. Based on the received approval, the server communicates to the user device, a verification code that is to be used at the transaction card dispenser for procuring the new transaction card. The new transaction card is dispensed by the transaction card dispenser following a successful verification of the verification code.

20 Claims, 20 Drawing Sheets

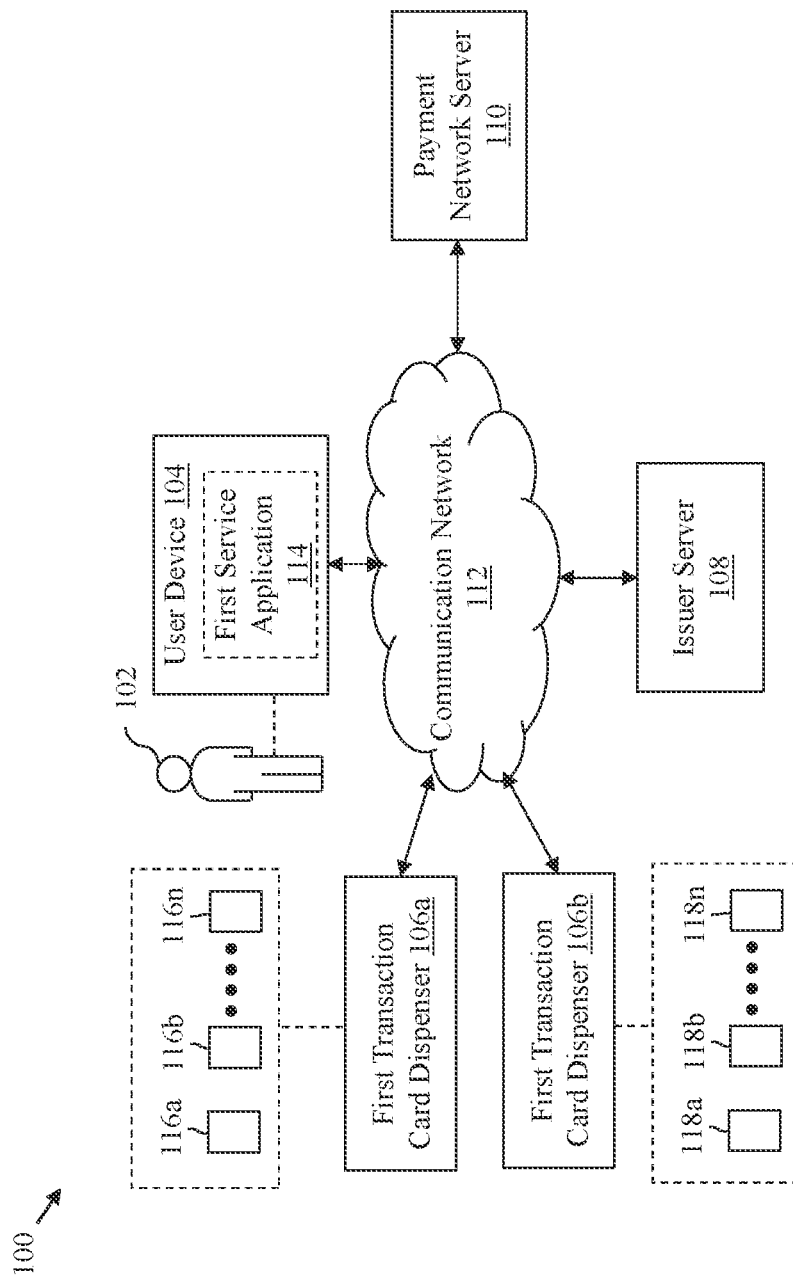

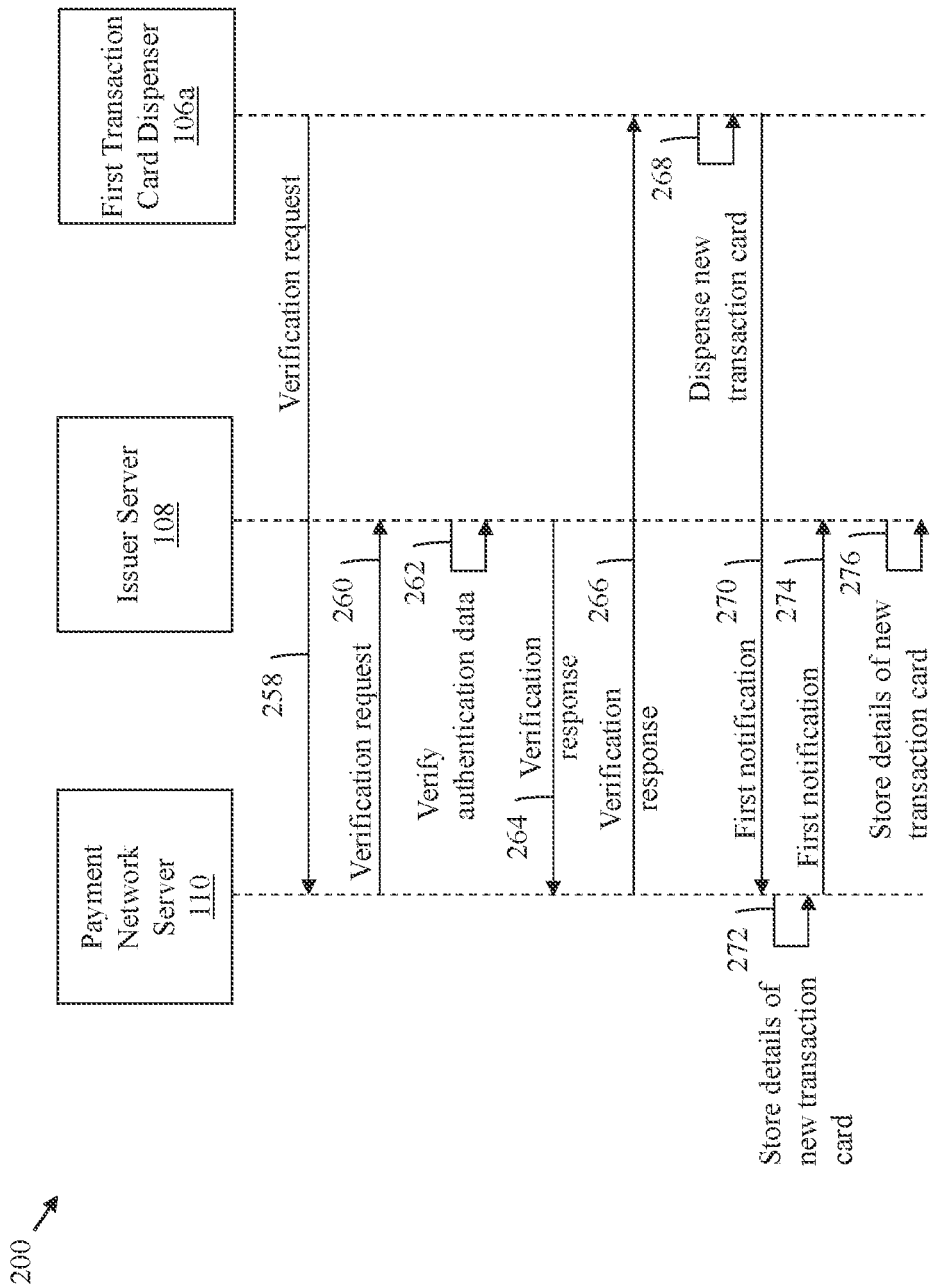

| Transaction card dispenser ID ← 402a | Number of transaction cards loaded ← 402b | Number of transaction cards dispensed ← 402c | Geographical location of transaction card dispenser (pin code) ← 402d | Account range of transaction cards loaded ← 402e |
|---|---|---|---|---|
| 541210111 | 50 | 4 | 10001 | 5543280000001-5543280000050 |
| 541210112 | 50 | 23 | 10005 | 5543280000051-5543280000100 |

404a → (row 1), 404b → (row 2)

| Transaction card dispenser ID ← 502a | Transaction card number ← 502b | Issuer identifier ← 502c | Date of procurement ← 502d | Expiry date ← 502e |
|---|---|---|---|---|
| 541210111 | 5543280000001 | 1445 | 11-28-2019 | 02-28-2020 |
| 541210111 | 5543280000002 | 1445 | 11-28-2019 | 02-28-2020 |
| 541210111 | 5543280000003 | 1445 | 11-30-2019 | 03-01-2020 |
| 541210111 | 5543280000004 | 1332 | 11-30-2019 | 03-01-2020 |

504a → (row 1), 504b → (row 2), 504c → (row 3), 504d → (row 4)

| Issuer identifier | Transaction card dispenser ID | Transaction card number | Date of procurement | Name of Cardholder | Disputed amount |
|---|---|---|---|---|---|
| 1445 | 541210111 | 554328000001 | 11-28-2019 | John Doe | $0 |
| 1445 | 541210111 | 554328000002 | 11-28-2019 | Jane Doe | $65 |
| 1445 | 541210111 | 554328000003 | 11-30-2019 | John Lewis | $0 |

FIG. 6

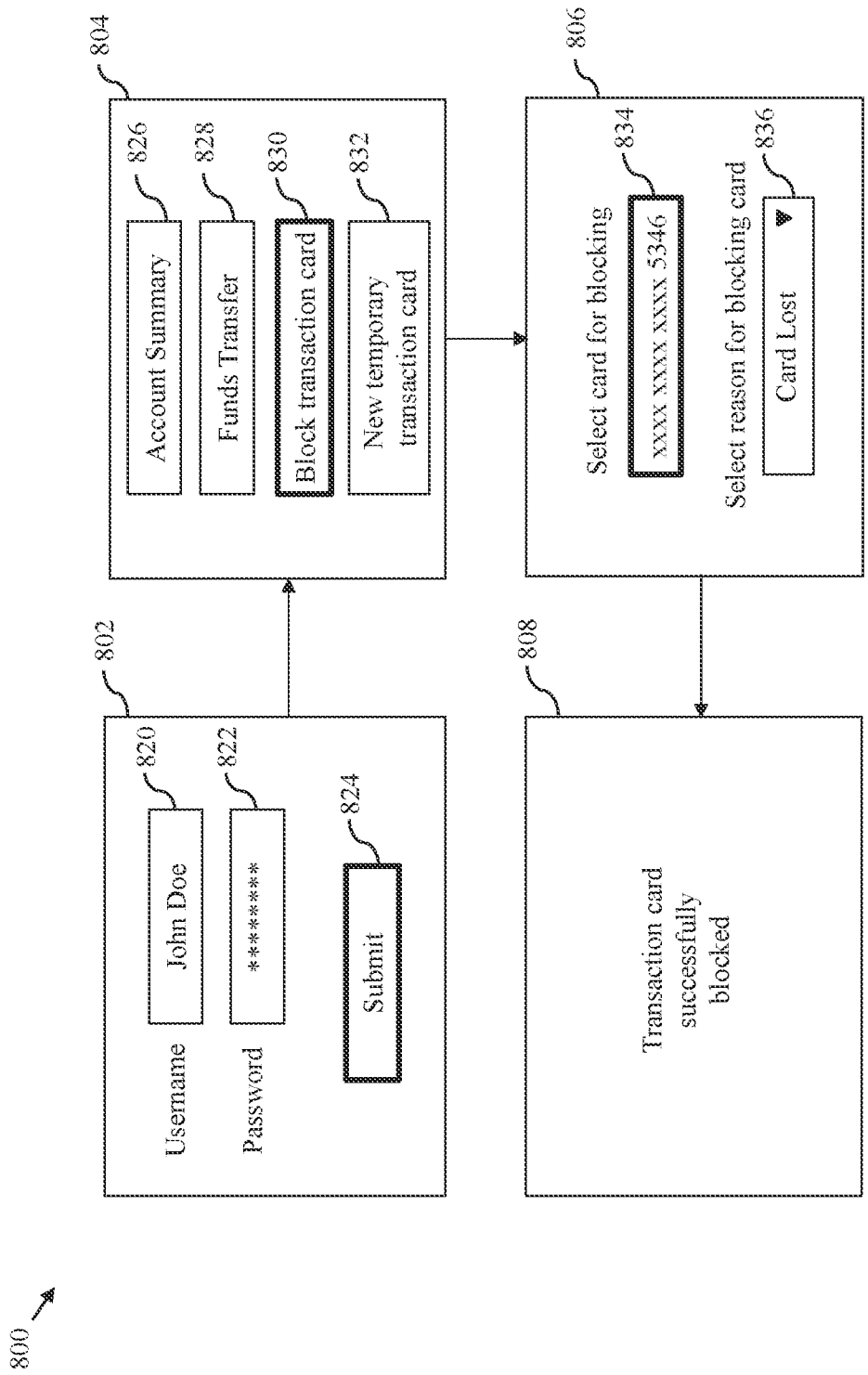

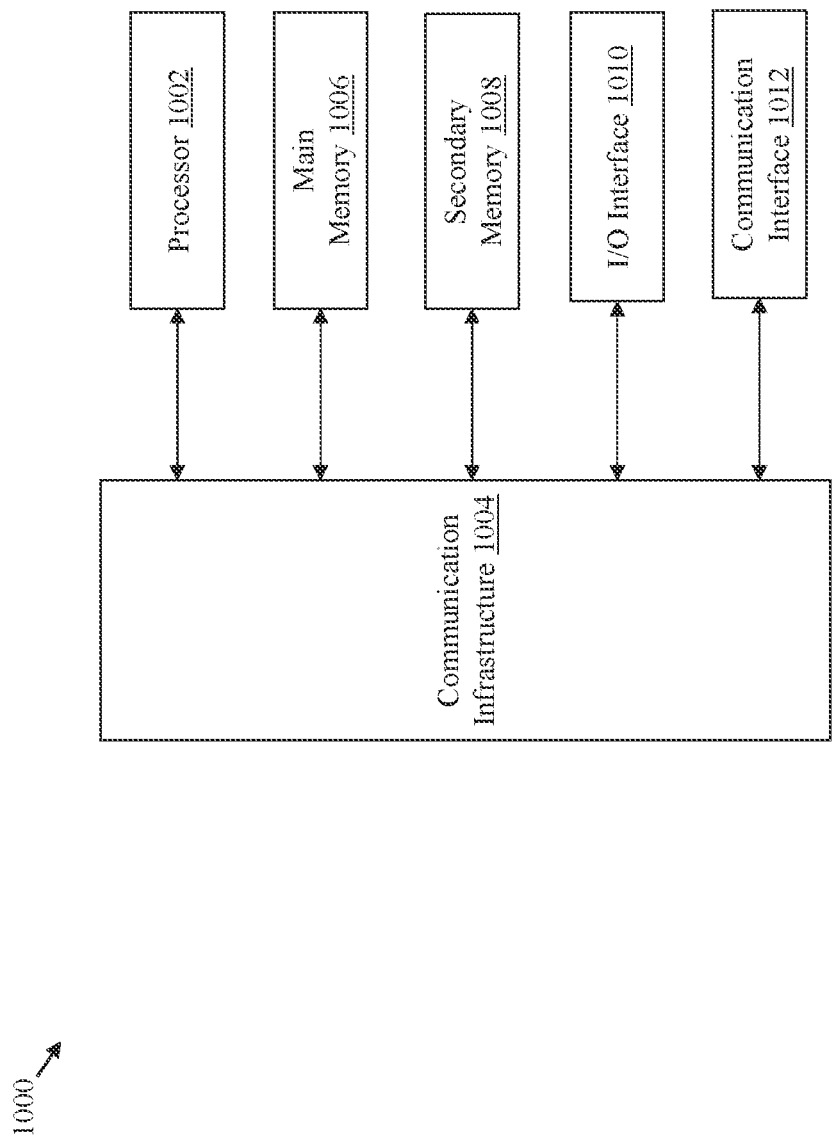

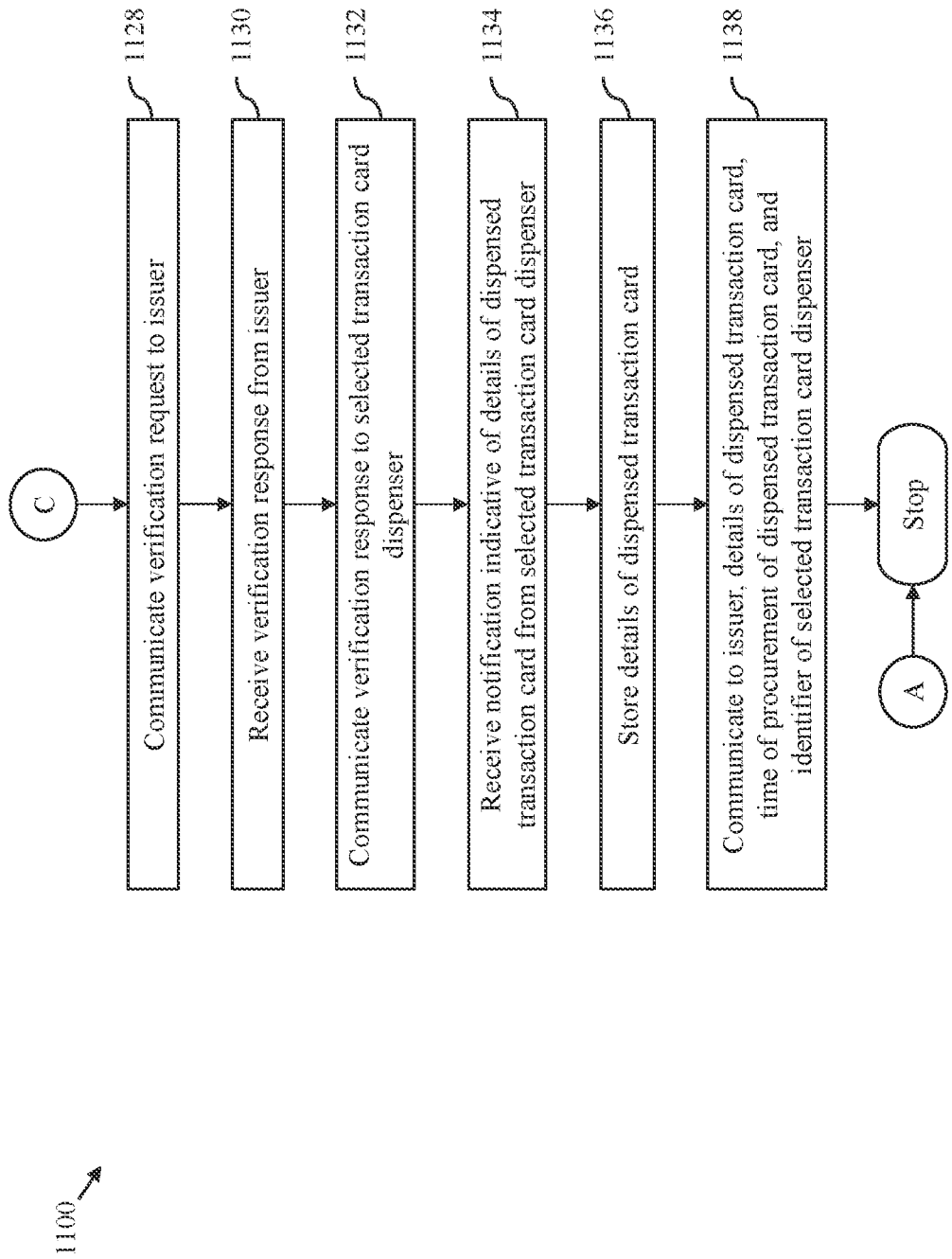

METHOD AND SYSTEM FOR FACILITATING TRANSACTION CARD PROCUREMENT

CROSS-REFERENCE TO RELATED APPLICATION

This application claims the benefit of, and priority to, Indian Patent Application No. 202021006530 filed on Feb. 14, 2020. The entire disclosure of the above application is incorporated herein by reference.

FIELD

Various embodiments of the disclosure relate generally to transaction cards. More particularly, various embodiments of the present disclosure relate to a method and a system for facilitating transaction card procurement.

BACKGROUND

This section provides background information related to the present disclosure which is not necessarily prior art.

Advancements in payment technologies have facilitated rapid proliferation of transaction cards. Usage of transaction cards to conduct transactions has become ubiquitous. For example, these days, instead of cash, users prefer using debit cards, credit cards, or pre-paid cards for conducting payment transactions.

Loss of transaction card(s) is a common occurrence. Theft and misplacement of transaction cards are the most common causes of loss of transaction cards. A user, who has lost a transaction card, is typically required to contact an issuer to block the lost transaction card, prior to lodging a request for obtaining a new transaction card. Blocking of the lost transaction card, generation of the new transaction card, and a consequent delivery of the new transaction card takes a substantial amount of time, generally spanning a few weeks. Further, the new transaction card may only be delivered to a registered address (e.g., a home address or an office address) of the user. Therefore, a user facing a paucity of time or a user travelling out of town may be heavily inconvenienced by a loss of a transaction card and, in an absence of an alternate transaction card, the user may be unable to conduct transactions.

In light of the foregoing, there is a need for a technical solution that solves the abovementioned problems and facilitates fast procurement of a new transaction card in case of loss of an old transaction card.

SUMMARY

This section provides a general summary of the disclosure, and is not a comprehensive disclosure of its full scope or all of its features. Aspects and embodiments of the disclosure are set out in the accompanying claims.

In an embodiment of the present disclosure, a method for facilitating transaction card procurement is provided. The method includes receiving, by a server, a card procurement request for procuring a new transaction card that is linked to a payment account of a user. The card procurement request is initiated by way of a user device of the user and includes a first identifier of a first transaction card dispenser that is selected for the procurement of the new transaction card. A card dispensing request is communicated by the server to the first transaction card dispenser for confirming an availability of the first transaction card dispenser to dispense the new transaction card. An approval for the card dispensing request is received by the server from the first transaction card dispenser. Based on the received approval, a verification code that is to be used at the first transaction card dispenser for procuring the new transaction card is communicated by the server to the user device. The verification code is provided by the user to the first transaction card dispenser, and following a successful verification of the verification code, the new transaction card is dispensed by the first transaction card dispenser for the user.

In another embodiment of the present disclosure, a system for facilitating transaction card procurement is provided. The system includes a payment network server configured to receive a card procurement request for procuring a new transaction card that is linked to a payment account of a user. The card procurement request is initiated by way of a user device of the user and includes a first identifier of a first transaction card dispenser that is selected for the procurement of the new transaction card. The payment network server communicates, to the first transaction card dispenser, a card dispensing request for confirming an availability of the first transaction card dispenser to dispense the new transaction card. The payment network server receives, from the first transaction card dispenser, an approval for the card dispensing request. Based on the received approval, the payment network server communicates, to the user device, a verification code that is to be used at the first transaction card dispenser for procuring the new transaction card. The verification code is provided to the first transaction card dispenser by the user, and following a successful verification of the verification code, the new transaction card is dispensed by the first transaction card dispenser for the user.

In another embodiment of the present disclosure, a system for facilitating transaction card procurement is provided. The system includes one or more transaction card dispensers and a server. The one or more transaction card dispensers are configured to store a plurality of transaction cards therein. The server is configured to receive a card procurement request for procuring a new transaction card that is linked to a payment account of a user. The card procurement request is initiated by way of a user device of the user and includes a first identifier of a first transaction card dispenser that is selected from the one or more transaction card dispensers for the procurement of the new transaction card. The server communicates, to the first transaction card dispenser, a card dispensing request for confirming an availability of the first transaction card dispenser to dispense the new transaction card. The server receives, from the first transaction card dispenser, an approval for the card dispensing request. The server communicates, to the user device, based on the received approval, a verification code that is to be used at the first transaction card dispenser for procuring the new transaction card. The first transaction card dispenser is configured to receive the verification code provided by the user and dispense the new transaction card of the plurality of transaction cards for the user, following a successful verification of the verification code.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Various embodiments of the present disclosure are illustrated by way of example, and not limited by the appended figures, in which like references indicate similar elements, and in which:

FIG. 1 is a block diagram that illustrates an exemplary environment for facilitating transaction card procurement, in accordance with an exemplary embodiment of the present disclosure;

FIGS. 2A-2F, collectively represent a process flow diagram for facilitating transaction card procurement, in accordance with an exemplary embodiment of the present disclosure;

FIG. 4 is a Table that illustrates a database maintained at the payment network server, in accordance with an exemplary embodiment of the present disclosure;

FIG. 5 is a Table that illustrates information conveyed by the payment network server to the issuer server, in accordance with an exemplary embodiment of the present disclosure;

FIG. 6 is a Table that illustrates another database maintained at the issuer server, in accordance with an exemplary embodiment of the present disclosure;

Figure 8B:
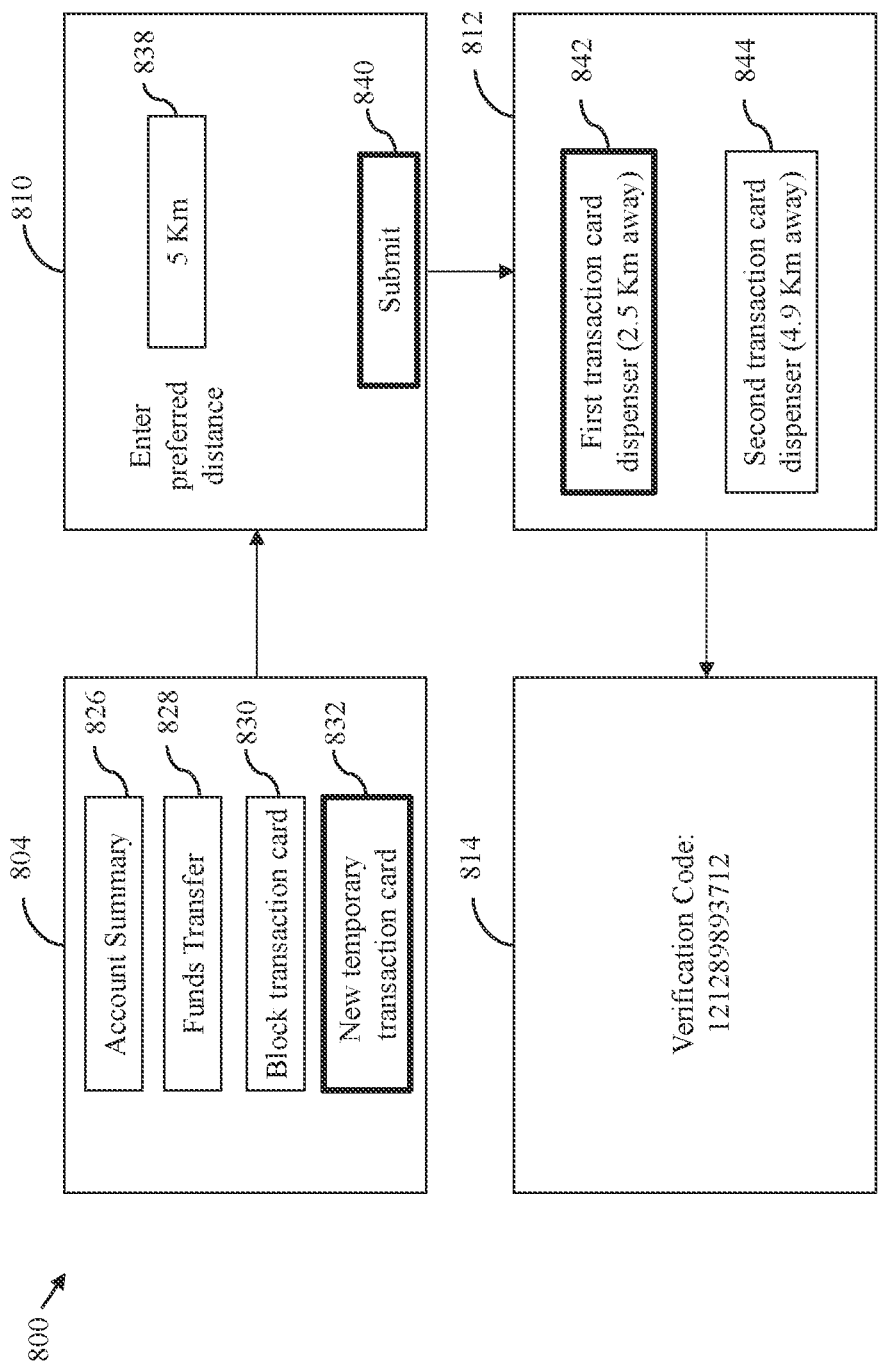
Figure 8C:
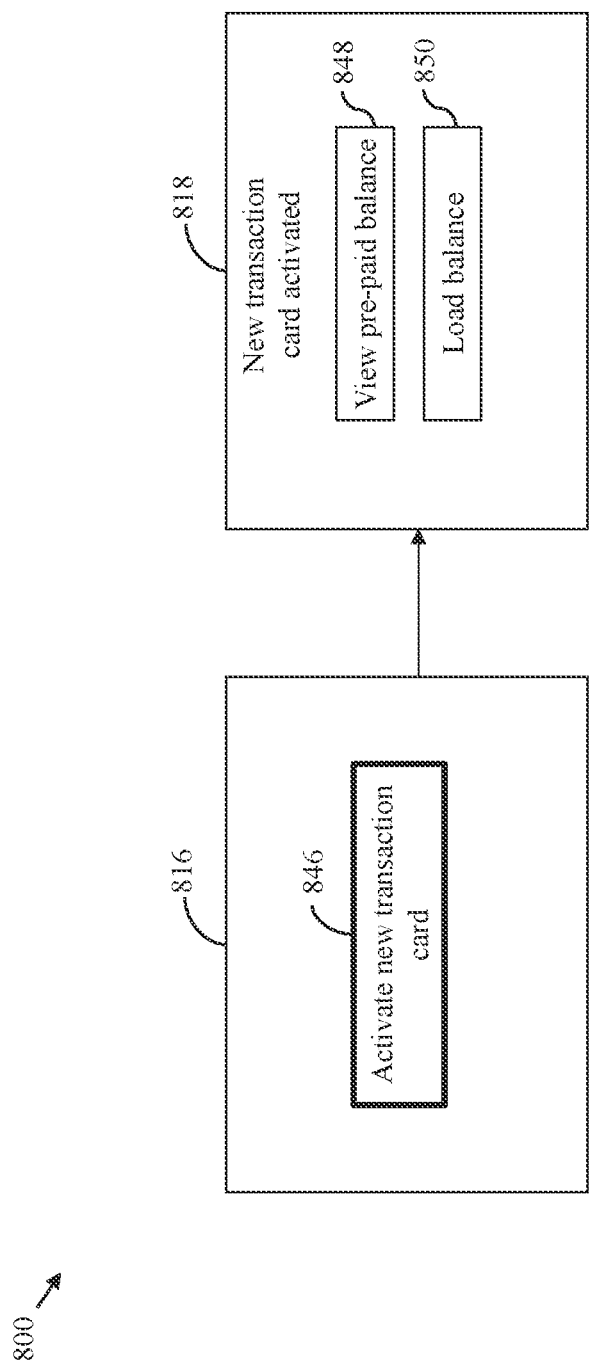
Figure 9:
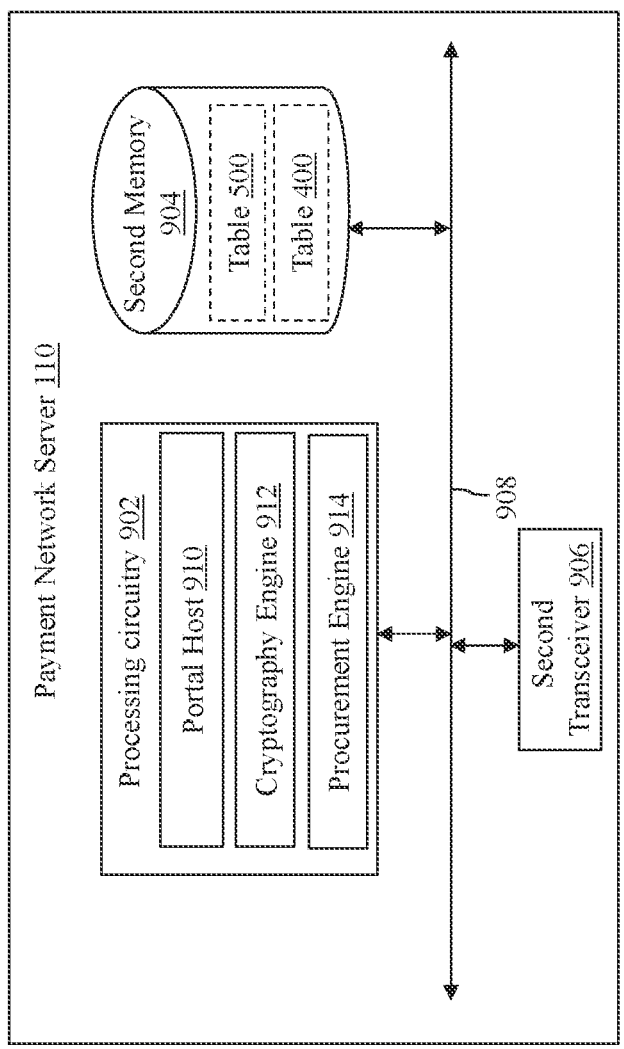
Figure 11A:
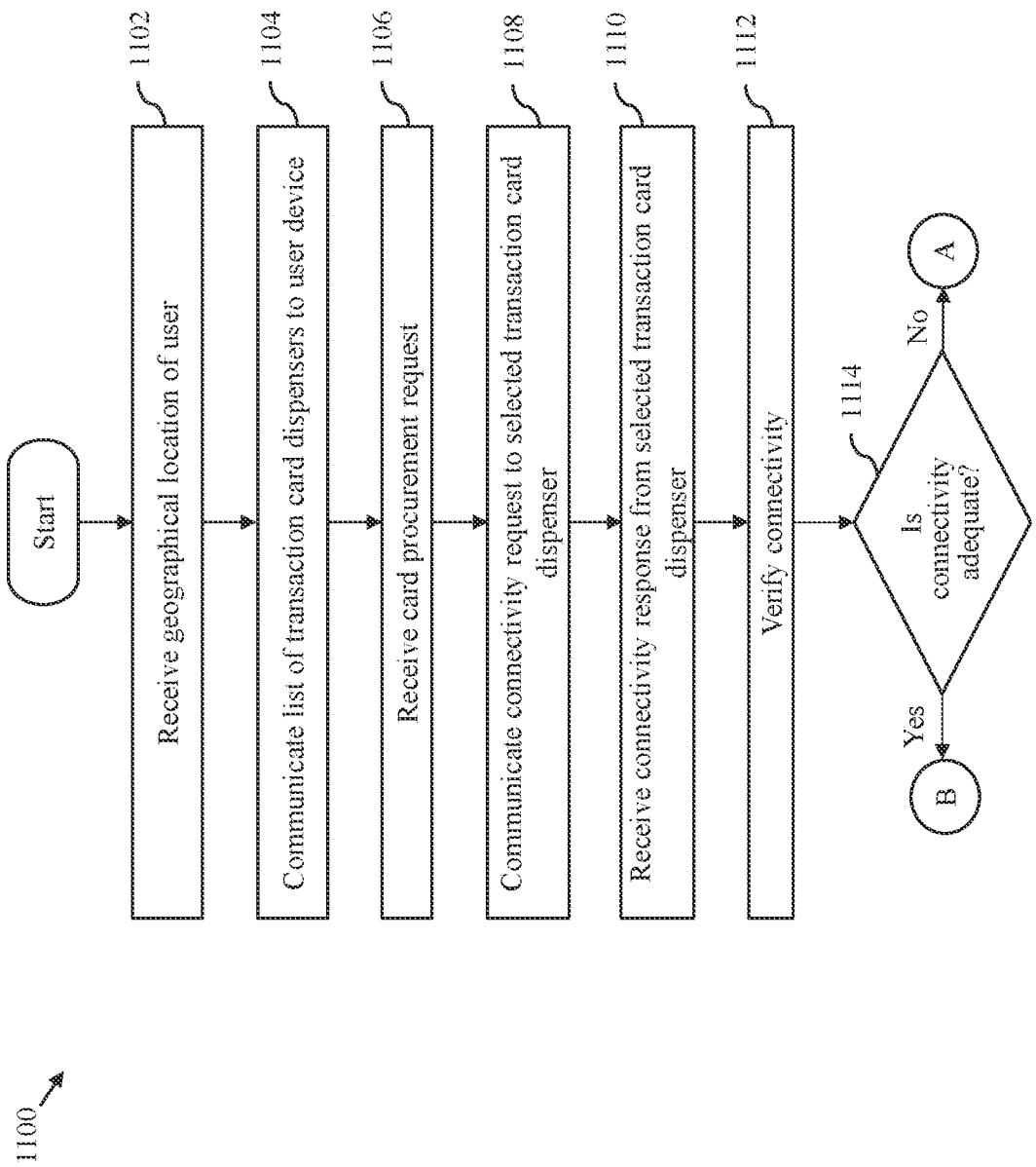
Figure 11B:
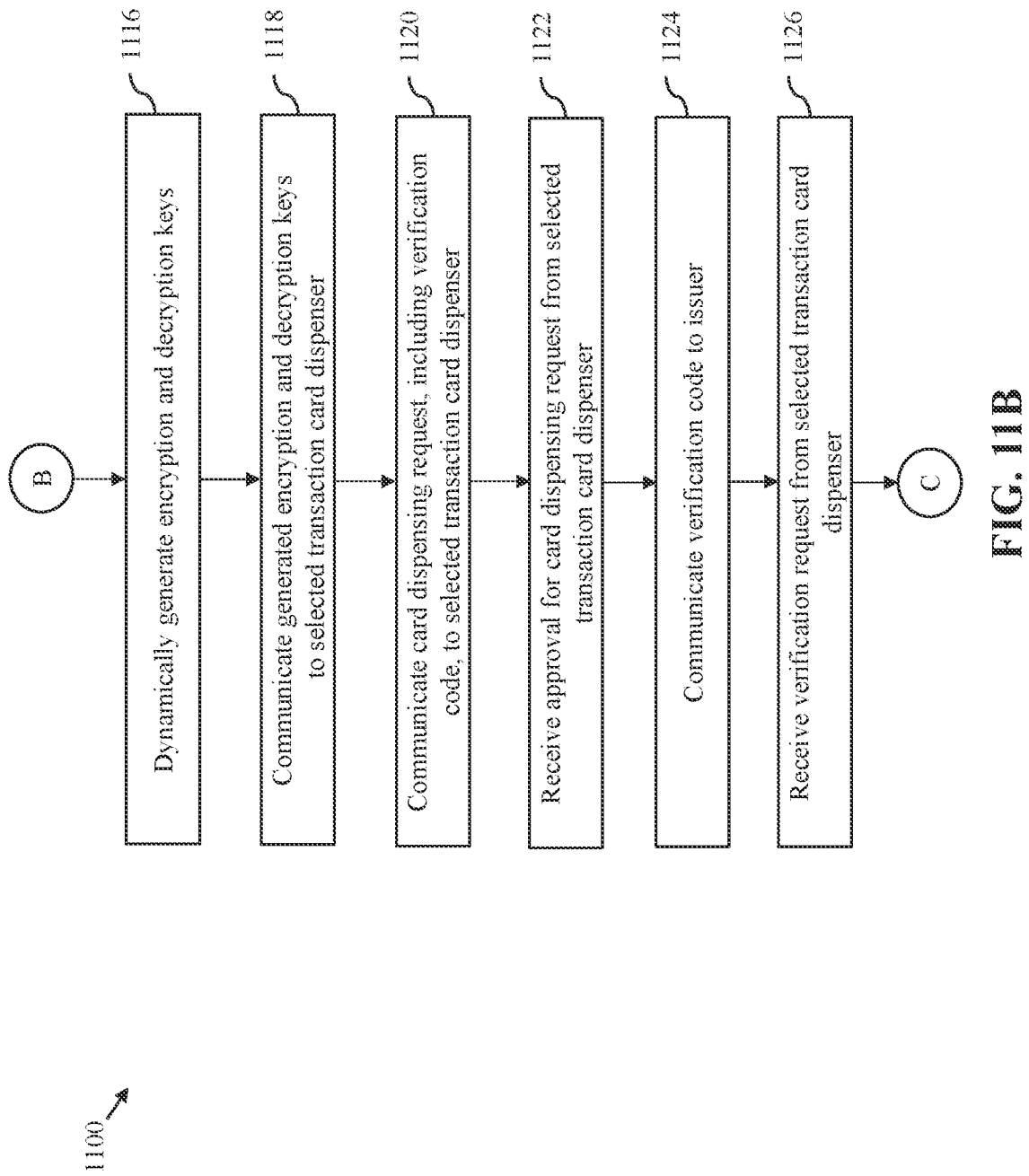
Figure 12:
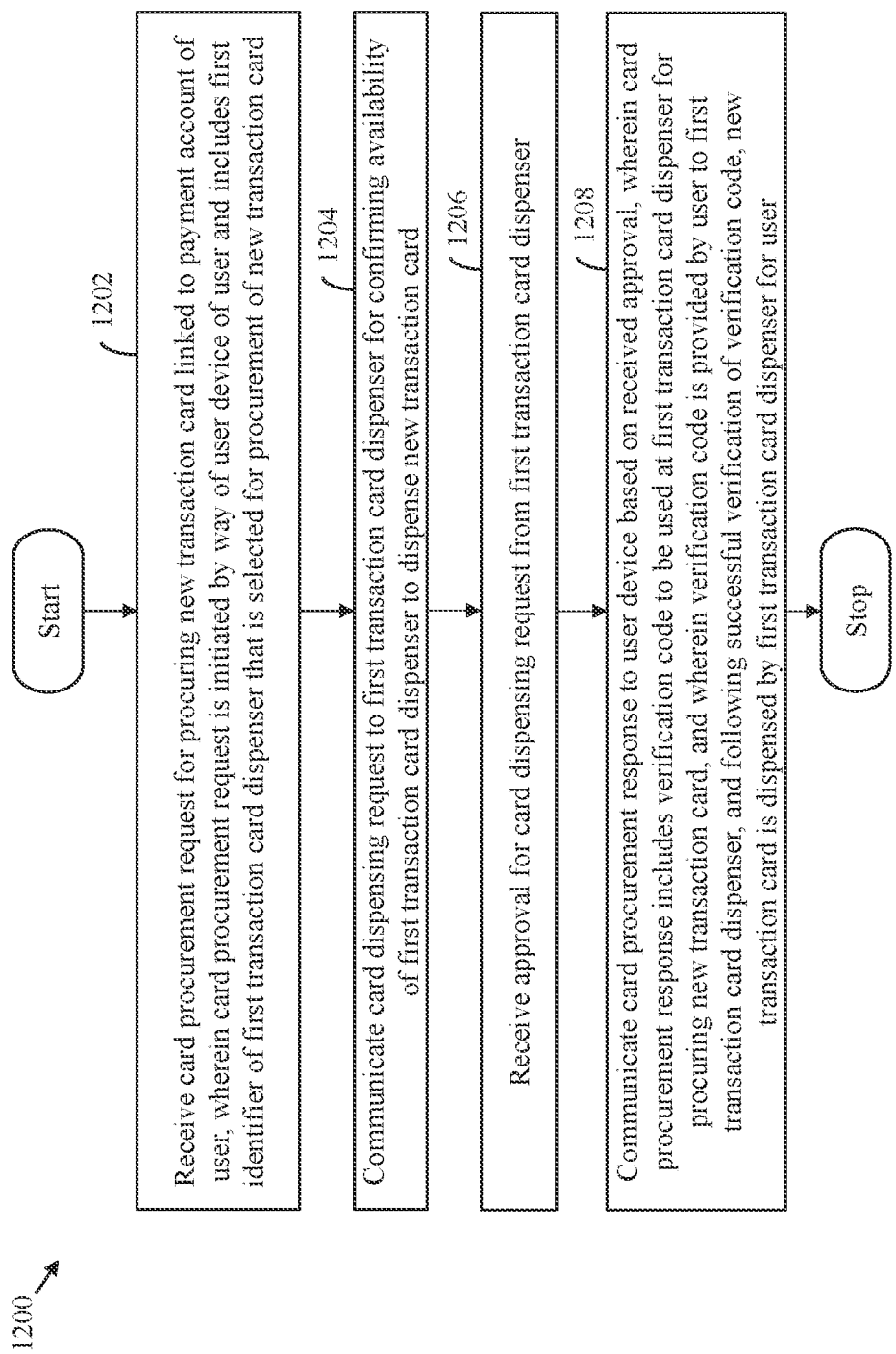

FIGS. 8A-8C, collectively represent an exemplary scenario that illustrates user interface screens that are rendered on a user device of FIG. 1 for facilitating transaction card procurement, in accordance with an embodiment of the present disclosure;

FIG. 9 is a block diagram that illustrates the payment network server, in accordance with an exemplary embodiment of the present disclosure;

FIG. 10 is a block diagram that illustrates a system architecture of a computer system, in accordance with an exemplary embodiment of the disclosure;

FIGS. 11A-11C, collectively represent a flow chart that illustrates a method for facilitating transaction card procurement, in accordance with an exemplary embodiment of the present disclosure; and FIG. 12 represents a high-level flow chart that illustrates a method for facilitating transaction card procurement, in accordance with an exemplary embodiment of the present disclosure.

Corresponding reference numerals indicate corresponding parts throughout the several views of the drawings. And, again, further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Transaction cards, such as debit cards, credit cards, or pre-paid cards, are prone to theft or misplacement. Blocking of lost transaction cards, and generation and delivery of new transaction cards is tedious and time-consuming. Further, the new transaction cards may only be delivered to registered addresses (e.g., a home address or an office address) of users. Therefore, the users are inconvenienced and may be unable to transact for substantial periods of time following loss of their transaction cards.

Various embodiments of the present disclosure provide a method and a system that solve the abovementioned problem by providing a solution that facilitates quick and easy procurement of transaction cards. The system of the present disclosure includes a server in communication with one or more transaction card dispensers that store a plurality of transaction cards. The server may include, but is not limited to, a payment network server, an issuer server, or the like. The server receives a card procurement request for procuring a new transaction card that is linked to a payment account of a user. The card procurement request is initiated by way of a user device of the user, upon blocking of an old transaction card associated with the payment account. The card procurement request includes a first identifier of a first transaction card dispenser that is selected by the user from the one or more transaction card dispensers for procuring the new transaction card. The server communicates to the first transaction card dispenser, a card dispensing request for confirming an availability of the first transaction card dispenser to dispense the new transaction card. The card dispensing request may include a verification code that uniquely identifies the card procurement request and is generated by the server. The server receives, from the first transaction card dispenser, an approval for the card dispensing request. Based on the received approval, the server then communicates to the user device, the verification code which is to be used by the user at the first transaction card dispenser for procuring the new transaction card. The verification code is then provided by the user to the first transaction card dispenser. Based on a successful verification of the verification code at the first transaction card dispenser, the new transaction card is dispensed by the first transaction card dispenser for the user. The new transaction card is a pre-paid card linked to the payment account of the user.

Thus, the method and system of the present disclosure enables quick and effortless procurement of new transaction cards following the loss of old transaction cards.

The following also provides term descriptions (in addition to plain and dictionary meaning).

Card procurement request is a request initiated by a user for procuring a new transaction card from a transaction card dispenser. For example, the user may initiate a card procurement request for procuring a new pre-paid card from the transaction card dispenser following blocking of an old transaction card of the user. The card procurement request is indicative of a pre-paid balance that is to be loaded into the new transaction card.

New transaction card is a transaction card associated with a payment account of a user. In one example, the new transaction card is a temporary pre-paid transaction card. The new transaction card is procured at a transaction card dispenser upon blocking of an old transaction card associated with the payment account.

Payment account is a financial account of a user maintained at a financial institution or entity, such as an issuer. The payment account of the user is linked to a transaction card issued to the user. Payment transactions are made from the payment account by using the transaction card.

Transaction card dispenser is a terminal device that stores a plurality of new transaction cards. The transaction card dispenser dispenses transaction cards for users based on card procurement requests initiated by the users. In one example, an automated teller machine (ATM), having stored therein the plurality of new transaction cards, may serve as the transaction card dispenser. In another example, the transaction card dispenser may be a transaction card vending machine.

Identifier of a transaction card dispenser is a code that uniquely identifies the transaction card dispenser. Examples of the identifier may include, but are not limited to, an alphanumeric code, a quick response (QR) code, a barcode, or the like.

Verification code is a code used to authenticate a user at a transaction card dispenser prior to procurement of a new transaction card by the user from the transaction card dispenser. Upon successful verification of the verification code at the transaction card dispenser, a new transaction card is dispensed by the transaction card dispenser for the user. Examples of the verification code may include, but are not limited to, an alphanumeric code, a QR code, a barcode, or the like.

Card dispensing request is a request communicated by a server to a transaction card dispenser for confirming an availability of the transaction card dispenser to dispense new transaction cards. For example, due to a technical fault or downtime due to maintenance, the transaction card dispenser may be unable to dispense any new transaction cards for the next two hours. In such a scenario, the transaction card dispenser rejects the card dispensing request. However, when the transaction card dispenser is available for dispensing new transaction cards, the transaction card dispenser approves the card dispensing request. The card dispensing request includes a verification code that uniquely identifies a card procurement request initiated by a user and is indicative of a pre-paid balance that is to be loaded into the new transaction card.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of an acquirer server, a payment network server, or an issuer server.

Embodiments will now be described, by way of example only, with reference to the drawings. The description and specific examples included herein are intended for purposes of illustration only and are not intended to limit the scope of the present disclosure.

FIG. 1 is a block diagram that illustrates an exemplary environment 100 for facilitating transaction card procurement, in accordance with an exemplary embodiment of the present disclosure. The environment 100 includes a user 102, a user device 104, first and second transaction card dispensers 106a and 106b, an issuer server 108, and a payment network server 110. The user device 104, the first and second transaction card dispensers 106a and 106b, the issuer server 108, and the payment network server 110 may communicate with each other by way of a communication network 112 or through separate communication networks established therebetween.

The user 102 may be an individual, who is a cardholder of a first transaction card. The first transaction card may be linked to a payment account of the user 102. The payment account may be maintained at a financial institution, such as an issuer. Examples of the first transaction card may include, but are not limited to, a debit card, a credit card, a pre-paid card, or the like.

The user device 104 may be a computing device of the user 102, such as a personal computer, a smartphone, a tablet, a phablet, a personal digital assistance (PDA), or the like. The user device 104 may be configured to run or execute applications, such as a first service application 114, hosted by the issuer server 108. The user 102 may avail one or more services offered by the issuer and/or a payment network, using the user device 104.

The first transaction card dispenser 106a may be a terminal device, which includes suitable logic, circuitry, interface, and/or code, executable by the circuitry, for storing and dispensing a plurality of new transaction cards 116a-116n (hereinafter, collectively referred to as 'the new transaction cards 116'). In one example, an automated teller machine (ATM), having stored therein the new transaction cards 116, may serve as the first transaction card dispenser 106a. In another example, the first transaction card dispenser 106a may be a stand-alone device, such as a transaction card vending machine. The first transaction card dispenser 106a may be associated with a financial entity, such as a payment network (e.g., the payment network server 110) or an issuer (e.g., the issuer server 108). The first transaction card dispenser 106a may be responsive to instructions issued by the payment network server 110 and may dispense one or more new transaction cards, based on the instructions. The second transaction card dispenser 106b is structurally and functionally similar to the first transaction card dispenser 106a, and stores therein another plurality of new transaction cards 118a-118n. Various components of the first transaction card dispenser 106a and their functions are described later in FIG. 7.

The issuer server 108 may be a computing server, which includes suitable logic, circuitry, interface, and/or code, executable by the circuitry, for facilitating easy and quick transaction card procurement. The issuer server 108 may be operated by the issuer that maintains the payment account of the user 102. The issuer may be a financial institution that manages payment accounts of multiple users (such as the user 102). Details of the payment accounts established with the issuer may be stored as account profiles. Each account profile may be indicative of a transaction history of a corresponding user. For example, a first account profile of the user 102 may be indicative of a transaction history of the user 102. The issuer server 108 may credit and debit the payment accounts based on transactions made by the users from their corresponding payment accounts. In a non-limiting example, the issuer server 108 may issue the first transaction card to the user 102. The issuer server 108 may also host the first service application 114. The first service application 114 may be a mobile application executable on the user device 104 or a web application accessible through the user device 104. The first service application 114 may enable users (e.g., the user 102) to initiate card procurement requests for procuring new transaction cards.

The payment network server 110 may be a computing server, which includes suitable logic, circuitry, interface, and/or code, executable by the circuitry, for facilitating procurement of new transaction cards. The payment network server 110 may be operated by the payment network (i.e., a payment interchange). The payment network server 110 may be in communication with a plurality of transaction card dispensers including the first and second transaction card dispensers 106a and 106b. The payment network server 110 may communicate with the plurality of transaction card dispensers to facilitate procurement of new transaction cards by users (e.g., the user 102). The payment network server 110 may additionally perform functions conventionally performed by the payment network or payment interchange. Functions conventionally performed by the payment network will be known to those of skill in the art.

The communication network 112 is a medium through which content and messages are transmitted between the user device 104, the first and second transaction card dispensers 106a and 106b, the issuer server 108, and the payment network server 110. Examples of the communication network 112 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the user 102 initiates a card block request for blocking the first transaction card (i.e., an old transaction card), following a loss of the first transaction card. The card block request may be initiated by way of the first service application 114 that runs on the user device 104. The card block request may be indicative of the loss of the first transaction card and may include details (e.g., a first transaction card number, a first expiry date, a first card verification value) of the first transaction card. The first service application 114 serves as a gateway to the issuer server 108, and thus the card block request initiated using the first service application 114 is communicated to the issuer server 108. The issuer server 108 blocks the first transaction card (i.e., the old transaction card) based on the received card block request.

Upon blocking the first transaction card, the user 102 initiates a card procurement request, by way of the first service application 114, for procuring a new transaction card (i.e., a temporary pre-paid transaction card) linked to the payment account. The first service application 114 may then detect a geographical location of the user 102 and render a first user interface (UI) on a display of the user device 104. The first UI presents a list of transaction card dispensers (e.g., the first and second transaction card dispensers 106a and 106b) that are available for procuring the new transaction card. The transaction card dispensers in the list may be within a first distance from the geographical location of the user 102. In other words, the transaction card dispensers in the list may be proximate to the detected geographical location of the user device 104. In a non-limiting example, the user 102 selects the first transaction card dispenser 106a from the list for procuring the new transaction card. The initiated card procurement request is then communicated to the payment network server 110 by the issuer server 108. The card procurement request is indicative of the selection of the first transaction card dispenser 106a by the user 102 for procuring the new transaction card. In other words, the card procurement request may include a first identifier of the first transaction card dispenser 106a. In one embodiment, the card procurement request may be further indicative of a second identifier of the issuer server 108, and a fixed amount (i.e., a pre-paid balance) that is to be deducted from the payment account of the user 102 and loaded into the new transaction card.

Based on the first identifier included in the card procurement request, the payment network server 110 identifies the first transaction card dispenser 106a. Following the identification, the payment network server 110 communicates, to the first transaction card dispenser 106a, a card dispensing request for confirming an availability of the first transaction card dispenser 106a to dispense a new transaction card. The card dispensing request may include a verification code that uniquely identifies the card procurement request initiated by the user 102 and may be indicative of the fixed amount that is to be loaded into the new transaction card.

Based on the availability of the first transaction card dispenser 106a, the first transaction card dispenser 106a communicates to the payment network server 110, an approval for the card dispensing request. The first transaction card dispenser 106a may be configured to store, in a corresponding memory, the card dispensing request. Based on the received approval from the first transaction card dispenser 106a, the payment network server 110 communicates the verification code to the issuer server 108. The issuer server 108 then communicates the verification code to the user device 104, thereby notifying the user 102 of the verification code.

Upon receiving the verification code through the user device 104, the user 102 may approach the first transaction card dispenser 106a and provide the verification code to the first transaction card dispenser 106a. Based on the verification code provided by the user 102, the first transaction card dispenser 106a accesses the card dispensing request stored in the corresponding memory. When the first transaction card dispenser 106a is successful in accessing the card dispensing request, the verification code provided by the user 102 is successfully verified. Following the successful verification of the verification code at the first transaction card dispenser 106a, the first transaction card dispenser 106a dispenses one of the new transaction cards 116 (e.g., the new transaction card 116a) for the user 102 (i.e., the user 102 procures the new transaction card 116a from the first transaction card dispenser 106a).

In one embodiment, the new transaction card 116a dispensed by the first transaction card dispenser 106a is inactive. The user 102 may access the first service application 114 through the user device 104 to activate the new transaction card 116a for use. The user 102 may further manage funds associated with the new transaction card 116a (i.e., the pre-paid balance loaded into the new transaction card 116a) using the first service application 114.

In one embodiment, the first transaction card dispenser 106a may implement an additional layer of security before dispensing the new transaction card 116a for the user 102. For example, the first transaction card dispenser 106a may prompt the user 102 to provide authentication data (e.g., biometric data, answers to one or more security questions, or the like). The first transaction card dispenser 106a may communicate, to the payment network server 110, a verification request, requesting the payment network server 110 to verify the authentication data of the user 102. The payment network server 110, in conjunction with the issuer server 108, may validate or verify the authentication data. Based on a result of the verification, the payment network server 110 may communicate a verification response to the first transaction card dispenser 106a. When the verification response is indicative of a successful verification of the authentication data, the first transaction card dispenser 106a dispenses the new transaction card 116a for the user 102. However, if the verification response is indicative of unsuccessful verification of the authentication data, the first transaction card dispenser 106a may not dispense the new transaction card 116a and may prompt the user 102 to re-enter the authentication data. In another embodiment, the authentication data may be verified at the first transaction card dispenser 106a instead of the issuer server 108, without deviating from the scope of the disclosure.

FIGS. 2A-2F, collectively represent a process flow diagram 200 for facilitating transaction card procurement, in accordance with an exemplary embodiment of the present disclosure. The process flow diagram 200 involves the user device 104, the first transaction card dispenser 106a, the issuer server 108, and the payment network server 110. FIGS. 2A-2F are explained in conjunction with FIG. 1.

Figure 2A:
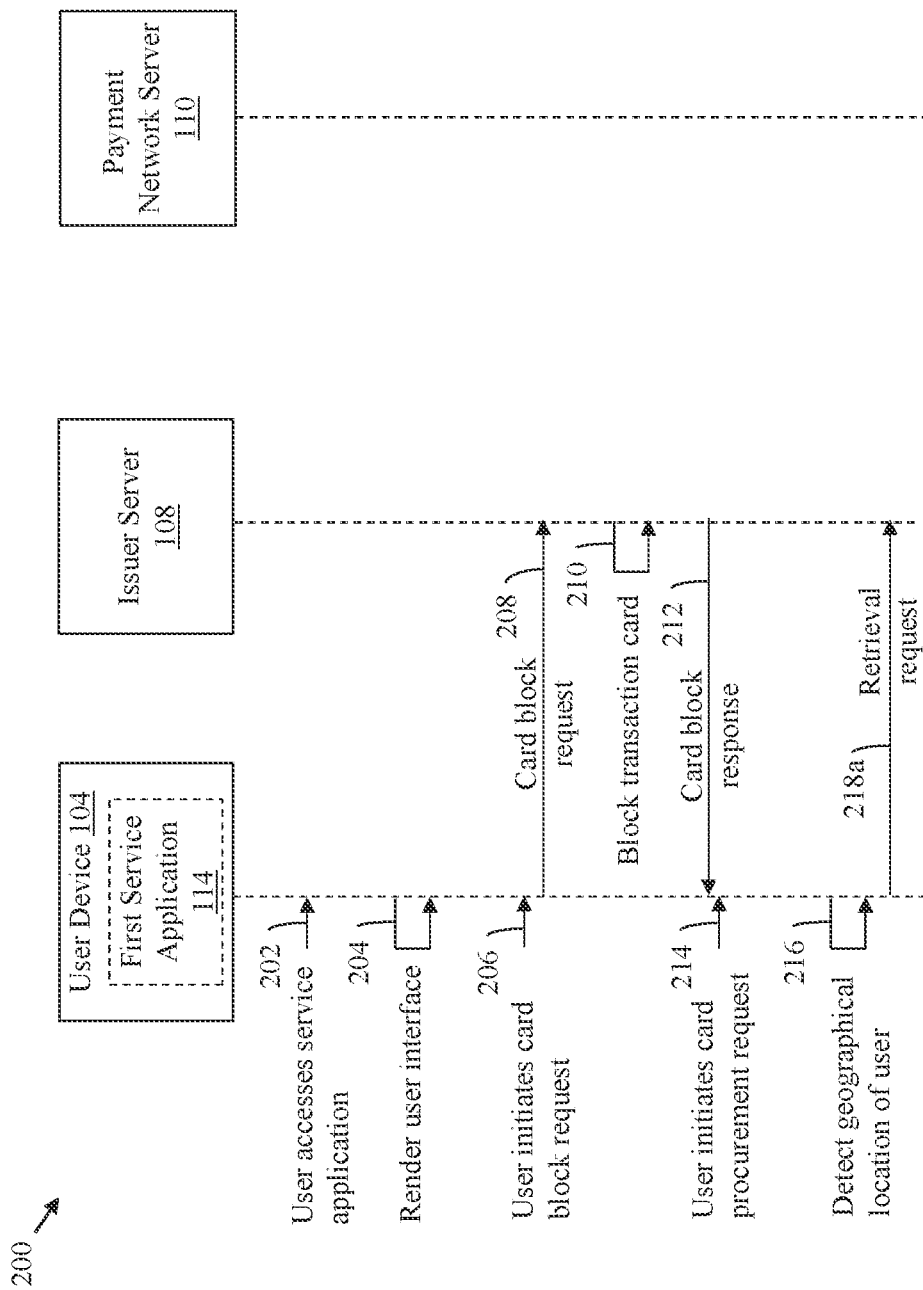

With reference to FIG. 2A, the user 102 accesses the first service application 114 following the loss of the first transaction card or an old transaction card linked to the payment account of the user 102 (as shown by arrow 202). The first service application 114 renders the first UI on the display of the user device 104 (as shown by arrow 204). The first UI may present one or more options that are selectable by the user 102. The user 102 then initiates a card block request for blocking the lost transaction card (i.e., the first transaction card) by selecting a first option of the one or more options (as shown by arrow 206). In one embodiment, for initiating the card block request, the first service application 114 may prompt the user 102 to select a transaction card that the user 102 wants to block. For example, the user 102 may be presented with a list of active transaction cards and prompted to select one of the active transaction cards for blocking. The user 102 may select the first transaction card from the list for blocking. The selection performed by the user 102 initiates the card block request. In one embodiment, the user 102 may further specify a reason for blocking the first transaction card. The user device 104 then communicates the card block request to the issuer server 108 that maintains the payment account linked to the first transaction card (as shown by arrow 208). The card block request is indicative of the reason and the first transaction card selected by the user 102 for blocking. The issuer server 108 blocks the first transaction card based on the card block request (as shown by arrow 210). Following the blocking of the first transaction card, the issuer server 108 communicates a card block response, indicating that the first transaction card is successfully blocked, to the user device 104 (as shown by arrow 212).

The user 102 then initiates a card procurement request for procuring a new transaction card linked to the payment account (as shown by arrow 214). The user 102 may initiate the card procurement request by selecting a second option of the one or more options presented on the first UI. In one embodiment, the card procurement request may only be initiated following the blocking of a previously issued transaction card that is linked to the payment account. Upon selection of the second option, the first service application 114 detects a geographical location of the user device 104 by way of global positioning system (GPS) installed in the user device 104 (as shown by arrow 216). Since, the user device 104 may be carried by the user 102, the detected geographical location of the user device 104 corresponds to a current geographical location of the user 102. In another embodiment, the user 102 may be prompted through the user device 104 to manually enter the current geographical location of the user 102. The user device 104 then communicates a retrieval request to the issuer server 108 for retrieving a list of transaction card dispensers that are in proximity (i.e., within the first distance of the geographical location) to the current geographical location of the user 102 (as shown by arrow 218a). In one embodiment, the user 102 may define the first distance while initiating the card procurement request.

Figure 2B:
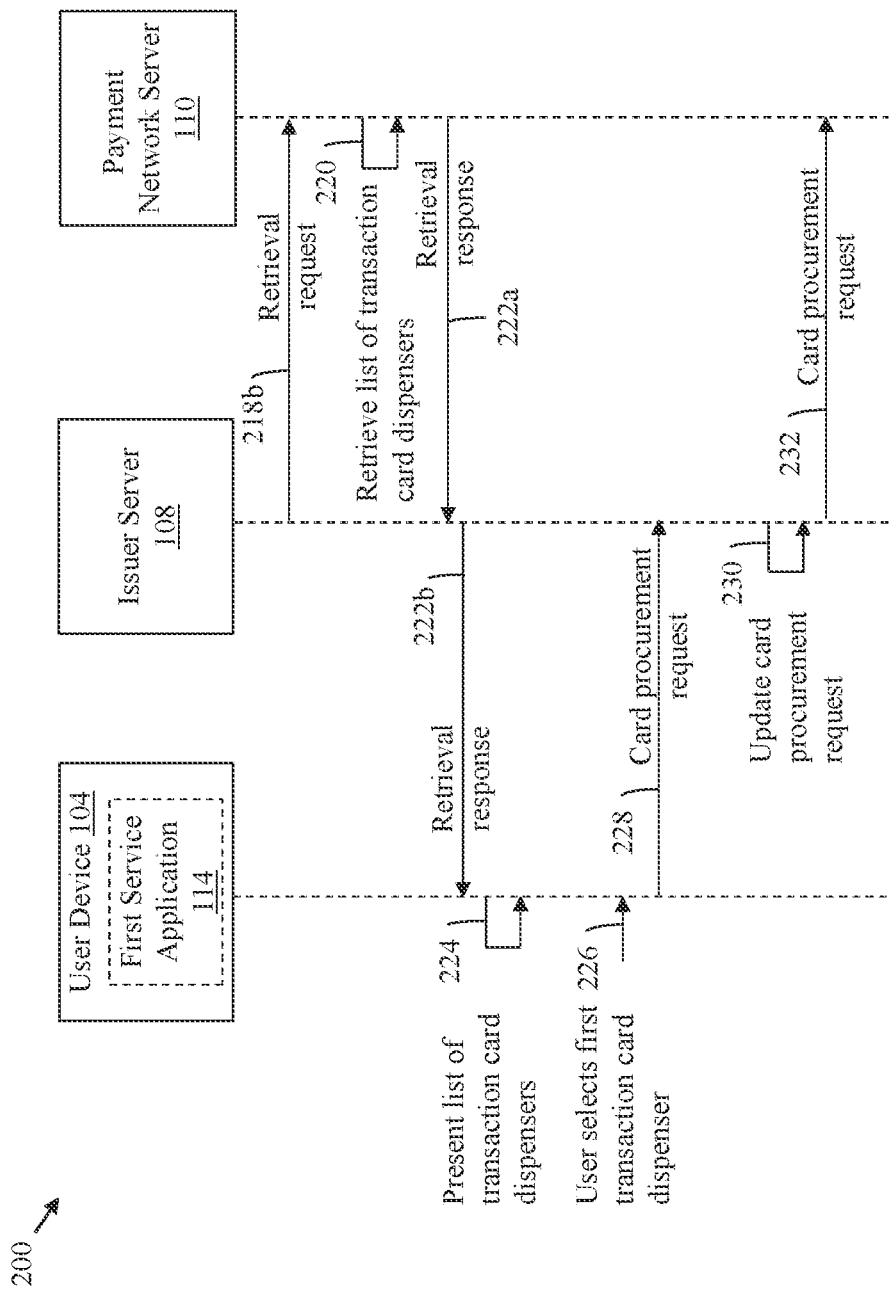

With reference to FIG. 2B, in one embodiment, the issuer server 108 further communicates the retrieval request to the payment network server 110 for retrieving the list of transaction card dispensers (as shown by arrow 218b). Based on the received retrieval request, the payment network server 110 retrieves the list of the transaction card dispensers that are within the first distance of the current geographical location of the user 102 (as shown by arrow 220). For example, the payment network server 110 may retrieve the list of the transaction card dispensers that are within five kilometers (Km) of the geographical location (here, the first distance is 5 Km). In one embodiment, the payment network server 110 may maintain a database that is indicative of locations (i.e., addresses) of various transaction card dispensers. In another embodiment, the database, indicative of the locations of the transaction card dispensers, is maintained at the issuer server 108. In such a scenario, the issuer server 108 may not communicate the retrieval request to the payment network server 110 and may retrieve the list of the transaction card dispensers from the database.

Following the retrieval of the list, the payment network server 110 communicates a retrieval response to the issuer server 108 (as shown by arrow 222a) and the issuer server 108 communicates the retrieval response to the user device 104 (as shown by arrow 222b). The retrieval response may include the list of the transaction card dispensers that are within the first distance of the current geographical location of the user 102. Based on the retrieval response, the first service application 114 presents on the first UI, for selection by the user 102, the list of the transaction card dispensers (as shown by arrow 224). In one example, the first transaction card dispenser 106a may be the most proximate to the current geographical location of the user 102. Consequently, the user 102 may select the first transaction card dispenser 106a from the list of the transaction card dispensers (as shown by arrow 226). The user device 104 then communicates the card procurement request to the issuer server 108 (as shown by arrow 228). The card procurement request may be indicative of the first identifier of the first transaction card dispenser 106a selected by the user 102 for procuring the new transaction card. The card procurement request may be further indicative of the detected geographical location of the user 102 and the pre-paid balance that is to be loaded into the new transaction card. The pre-paid balance that is to be loaded in the new transaction card may be specified by the user 102 while initiating the card procurement request. The issuer server 108 updates the card procurement request to include the second identifier (e.g., an interbank card association number, ICA number) of the issuer (as shown by arrow 230). The issuer server 108 communicates the card procurement request having the second identifier to the payment network server 110 (as shown by arrow 232).

Figure 2C:
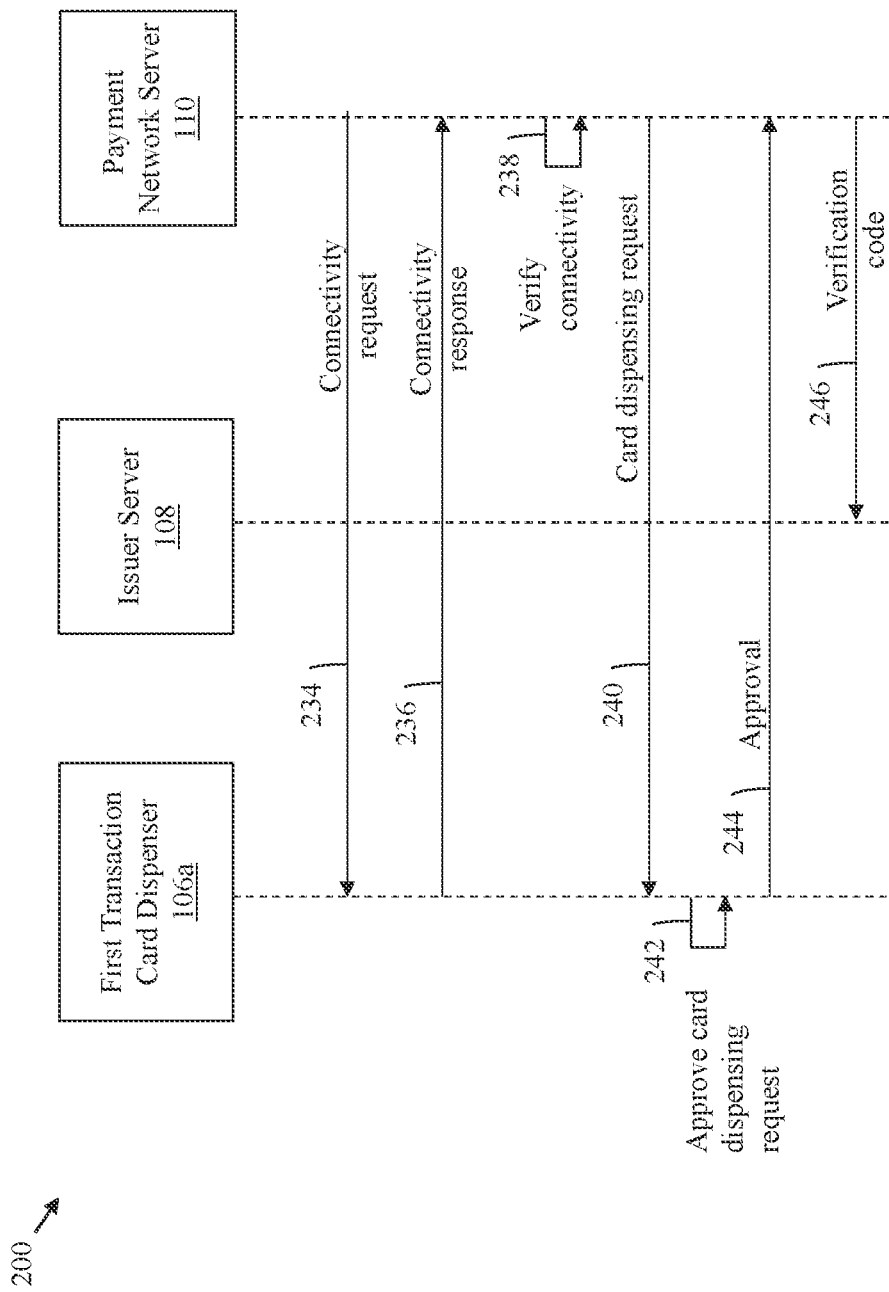

With reference to FIG. 2C, based on the received card procurement request, the payment network server 110 communicates a connectivity request to the first transaction card dispenser 106a to verify network connectivity (i.e., verify quality of a network connection) between the payment network server 110 and the first transaction card dispenser 106a (as shown by arrow 234). Following the communication of the connectivity request, the payment network server 110 waits for a fixed period of time for a connectivity response from the first transaction card dispenser 106a. If the payment network server 110 fails to receive the connectivity response from the first transaction card dispenser 106a within the fixed period of time, the payment network server 110 may communicate a notification to the issuer server 108, indicating a lack of network connectivity with the first transaction card dispenser 106a. Consequently, the issuer server 108 may communicate another notification to the user device 104, indicating the failure to procure the new transaction card at the selected first transaction card dispenser 106a.

However, in the current embodiment, it is assumed that the first transaction card dispenser 106a communicates the connectivity response to the payment network server 110 within the fixed period of time (as shown by arrow 236). Based on the received connectivity response, the payment network server 110 verifies the network connectivity (i.e., the quality of the network connection) between the payment network server 110 and the first transaction card dispenser 106a (as shown by arrow 238). To confirm the availability of the first transaction card dispenser 106a for dispensing new transaction cards, the payment network server 110 communicates a card dispensing request to the first transaction card dispenser 106a (as shown by arrow 240). The card dispensing request is indicative of the card procurement request initiated by the user 102 and a verification code (e.g., a unique twelve-digit code) that uniquely identifies the card procurement request. Prior to the communication of the card dispensing request, the payment network server 110 may share a first set of encryption-decryption keys with the first transaction card dispenser 106a. The first set of encryption-decryption keys may be dynamically generated by the payment network server 110. The first transaction card dispenser 106a may use the first set of encryption-decryption keys for encrypting and/or decrypting communication messages communicated to or received from the payment network server 110. For example, the verification code communicated to the first transaction card dispenser 106a may be in an encrypted format. Thus, the first transaction card dispenser 106a may use the first set of encryption-decryption keys to decrypt the encrypted verification code.

Based on the received card dispensing request, the first transaction card dispenser 106a assesses a corresponding inventory of the first transaction card dispenser 106a to determine whether a new transaction card is available for dispensing. The first transaction card dispenser 106a may approve the card dispensing request when a new transaction card is available for dispensing and there is no technical or operation fault in the first transaction card dispenser 106a (as shown by arrow 242). Consequently, the first transaction card dispenser 106a communicates an approval for the card dispensing request to the payment network server 110 (as shown by arrow 244). Further, the first transaction card dispenser 106a may be configured to store the card dispensing request in the corresponding memory.

Based on the received approval, the payment network server 110 communicates the verification code to the issuer server 108 (as shown by arrow 246). The verification code communicated to the issuer server 108 may be in an encrypted format. The communication of the verification code may be preceded by an exchange of a second set of encryption-decryption keys between the issuer server 108 and the payment network server 110 for encrypting and/or decrypting communication messages (e.g., the verification code) shared between the issuer server 108 and the payment network server 110.

Figure 2D:
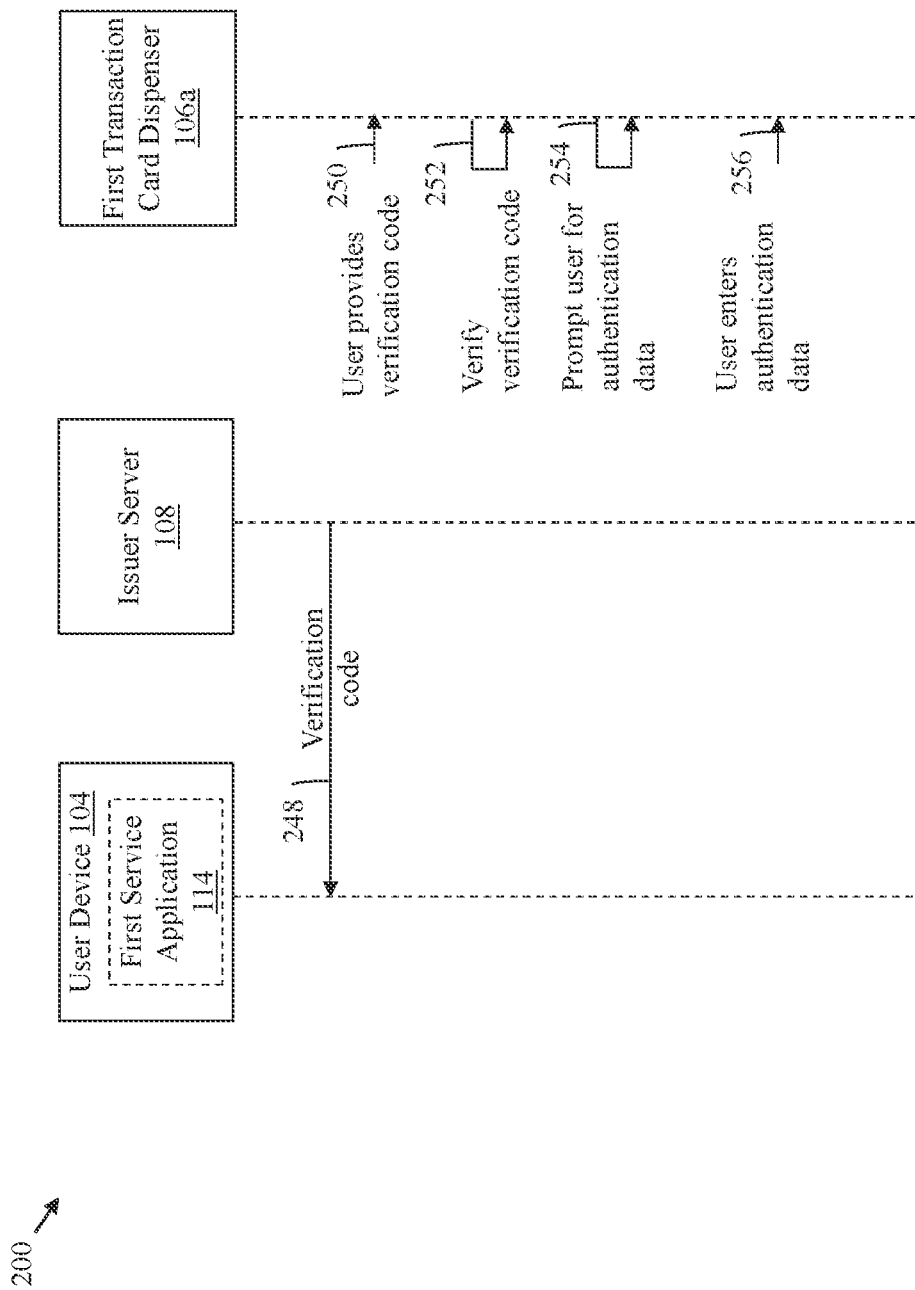

With reference to FIG. 2D, the issuer server 108 decrypts the verification code and communicates the decrypted verification code to the user device 104 (as shown by arrow 248). The communication of the verification code may take place by way of text message, an electronic mail (e-mail), a notification on the first service application 114, or the like. On reaching the location of the first transaction card dispenser 106a, the user 102 may approach the first transaction card dispenser 106a and provide the verification code to the first transaction card dispenser 106a (as shown by arrow 250). In one example, the user 102 utilizes a keypad of the first transaction card dispenser 106a for providing the verification code to the first transaction card dispenser 106a. In another example, the first transaction card dispenser 106a may include a scanning device (e.g., one or more image sensors) that is configured to scan the verification code displayed on the display of the user device 104. In another example, the first transaction card dispenser 106a may be near field communication (NFC) enabled for receiving the verification code from the user device 104 via an NFC channel.

Upon receiving the verification code, the first transaction card dispenser 106a verifies the verification code (as shown by arrow 252). The verification code may be verified by comparing the verification code provided by the user 102 and the verification code received from the payment network server 110. Further, the first transaction card dispenser 106a may attempt to access the card dispensing request stored in its memory using the verification code. In a scenario, when no card dispensing request is available corresponding to the verification code provided by the user 102, the first transaction card dispenser 106a determines that the verification code is invalid. In another scenario, when the first transaction card dispenser 106a is able to retrieve the card dispensing request using the verification code provided by the user 102 from its memory, the first transaction card dispenser 106a determines that the verification code is successfully verified.

In some embodiments, the first transaction card dispenser 106a may implement an additional layer of security. For example, the first transaction card dispenser 106a may prompt the user 102 to provide the authentication data of the user 102. Examples of the authentication data may include, but is not limited to, biometric data (e.g., a fingerprint scan, a face scan, or a retina scan), the answers to the security questions (e.g., details of last five transactions or an online banking username and password), or the like. In a non-limiting example, it is assumed that the first transaction card dispenser 106a prompts the user 102 to provide biometric data of the user 102 in a form of a fingerprint scan (as shown by arrow 254). For the sake of brevity, the terms 'authentication data' and 'biometric data' are interchangeably used. Based on the prompt for the biometric data, the user 102 may scan a finger of the user 102 at the first transaction card dispenser 106a (as shown by arrow 256) and the first transaction card dispenser 106a then receives the fingerprint scan of the user 102.

With reference to FIG. 2E, in one embodiment, the first transaction card dispenser 106a may communicate, to the payment network server 110, a verification request (as shown by arrow 258) for verifying the biometric data provided by the user 102. The verification request may be encrypted by way of the first set of encryption-decryption keys. The payment network server 110 may communicate the verification request to the issuer server 108 (as shown by arrow 260). The issuer server 108 may verify the received biometric data by comparing the received biometric data with biometric data of the user 102 stored in a database in a memory of the issuer server 108 (as shown by arrow 262). Based on a match between the received biometric data and the biometric data stored in the database, the issuer server 108 may communicate a verification response to the payment network server 110 (as shown by arrow 264). The verification response communicated by the issuer server 108 may be indicative of the successful verification of the biometric data (i.e., the authentication data of the user 102). The payment network server 110 may communicate the verification response to the first transaction card dispenser 106a (as shown by arrow 266). Based on the verification response, the first transaction card dispenser 106a may dispense the new transaction card 116a (as shown by arrow 268). In other words, the user 102 may procure the new transaction card 116a from the first transaction card dispenser 106a. Following the dispensing of the new transaction card, the first transaction card dispenser 106a may communicate a first notification to the payment network server 110 (as shown by arrow 270). The first notification may be indicative of details of the new transaction card 116a. The details of the new transaction card 116a may include a second transaction card number, a second expiry date, a time of procurement or a date of procurement of the new transaction card 116a, or the like. The details of the new transaction card 116a may further include the pre-paid balance that is loaded into the new transaction card 116a. The payment network server 110 may store, in a database in a memory of the payment network server 110, the details of the new transaction card 116a in association with the second identifier of the issuer (as shown by arrow 272). The payment network server 110 may further communicate the first notification to the issuer server 108 (as shown by arrow 274). The issuer server 108 may store the details of the new transaction card 116a in a corresponding memory (as shown by arrow 276).

It will be apparent to those of skill in the art that prompting the user 102 to provide the authentication data is a security feature and may not always be necessary. In some embodiments, the first transaction card dispenser 106a may not prompt the user 102 for the authentication data. The first transaction card dispenser 106a may dispense the new transaction card 116a for the user 102 following the successful verification of the verification code. In such scenarios, the first transaction card dispenser 106a may communicate the first notification to the payment network server 110 following the dispensing of the new transaction card 116a. Consequently, the payment network server 110 may communicate the first notification to the issuer server 108. In some embodiments, the authentication data provided by the user 102 may be verified by the first transaction card dispenser 106a instead of the issuer server 108, without deviating from the scope of the disclosure.

Figure 2F:
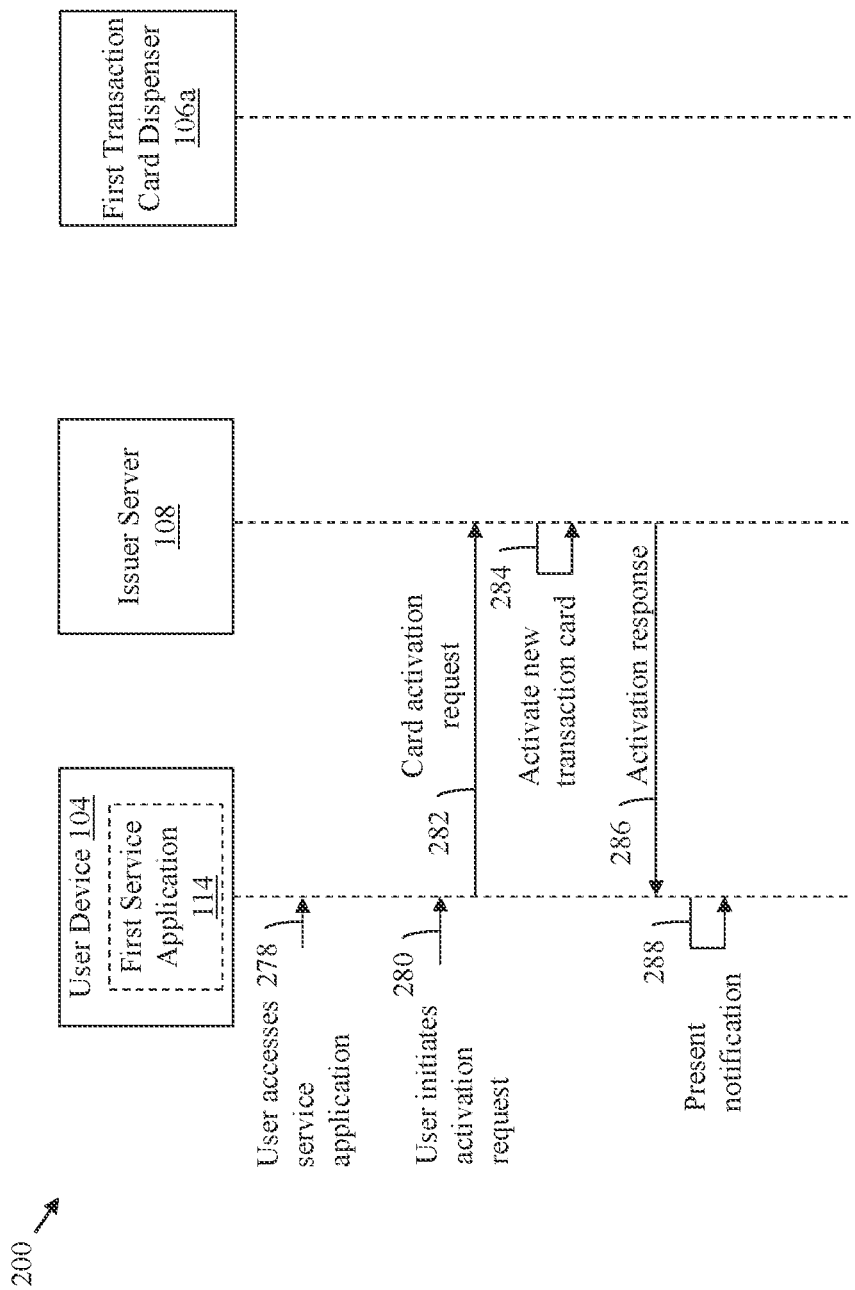

With reference to FIG. 2F, the new transaction card 116a, when dispensed, may be inactive until activated by the user 102. The user 102 uses the first service application 114 to activate the new transaction card 116a. The user 102 accesses the first service application 114 (as shown by arrow 278) and initiates a card activation request to activate the new transaction card 116a (as shown by arrow 280). The user device 104 then communicates the card activation request to the issuer server 108 (as shown by arrow 282). Based on the received card activation request, the issuer server 108 activates the new transaction card 116a (as shown by arrow 284). In other words, the new transaction card 116a with the loaded pre-paid balance may, now, be available for use. Consequently, the issuer server 108 communicates an activation response to the user device 104 (as shown by arrow 286). The activation response may be indicative of the activation of the new transaction card 116a. Upon receiving the activation response, the first service application 114 presents a notification to notify the user 102 that the new transaction card 116a is not active (as shown by arrow 288). The user 102 may further use the first service application 114 to manage funds associated with the new transaction card 116a. Managing funds using the first service application 114 may include, but not limited to, transferring additional pre-paid balances from the payment account to the new transaction card 116a or transferring the remaining pre-paid balance from the new transaction card 116a to the payment account.

In a non-limiting example, the payment network server 110 may be configured to generate a list of internal identification numbers (IINs) for identifying new transaction cards that are stored in the plurality of transaction card dispensers (e.g., the first and second transaction card dispensers 106a and 106b). The payment network server 110 may utilize the list of IINs to generate transaction card numbers for new transaction cards that are to be stored in the plurality of transaction card dispensers. The list of IINs may be issuer-agnostic. In other words, the generated transaction card numbers may not be issuer-specific.

In some embodiments, the issuer server 108, on receiving the card procurement request, may compare the pre-paid balance entered by the user 102 with an account balance of the payment account of the user 102. If the pre-paid balance exceeds the account balance, the issuer server 108 may reject the card procurement request and communicate a message to the user device 104, requesting the user 102 to enter a lower pre-paid balance.

In some embodiments, the payment network server 110 may further communicate a validity period to the first transaction card dispenser 106a, in addition to the verification code. The validity period may be indicative of a time period (e.g., one hour, 10 hours, two days, or the like) for which the verification code is valid. The first transaction card dispenser 106a may reserve the new transaction card 116a for procurement by the user 102 for the validity period. If the user 102 fails to approach the first transaction card dispenser 106a and enter the verification code at the first transaction card dispenser 106a before an expiry of the validity period, the user 102 may be required to initiate a new card procurement request.

Although in FIGS. 2A-2F, the payment network server 110 is shown to facilitate the process for transaction card procurement. In another embodiment, the process for facilitating transaction card procurement may be performed by the issuer server 108. For example, the issuer server 108 may communicate the connectivity request, the card dispensing request, and the verification code to the first transaction card dispenser 106a instead of the payment network server 110. In other words, functionality of the payment network server 110 may be implemented by the issuer server 108 without deviating from the scope of the disclosure.

Figure 3:
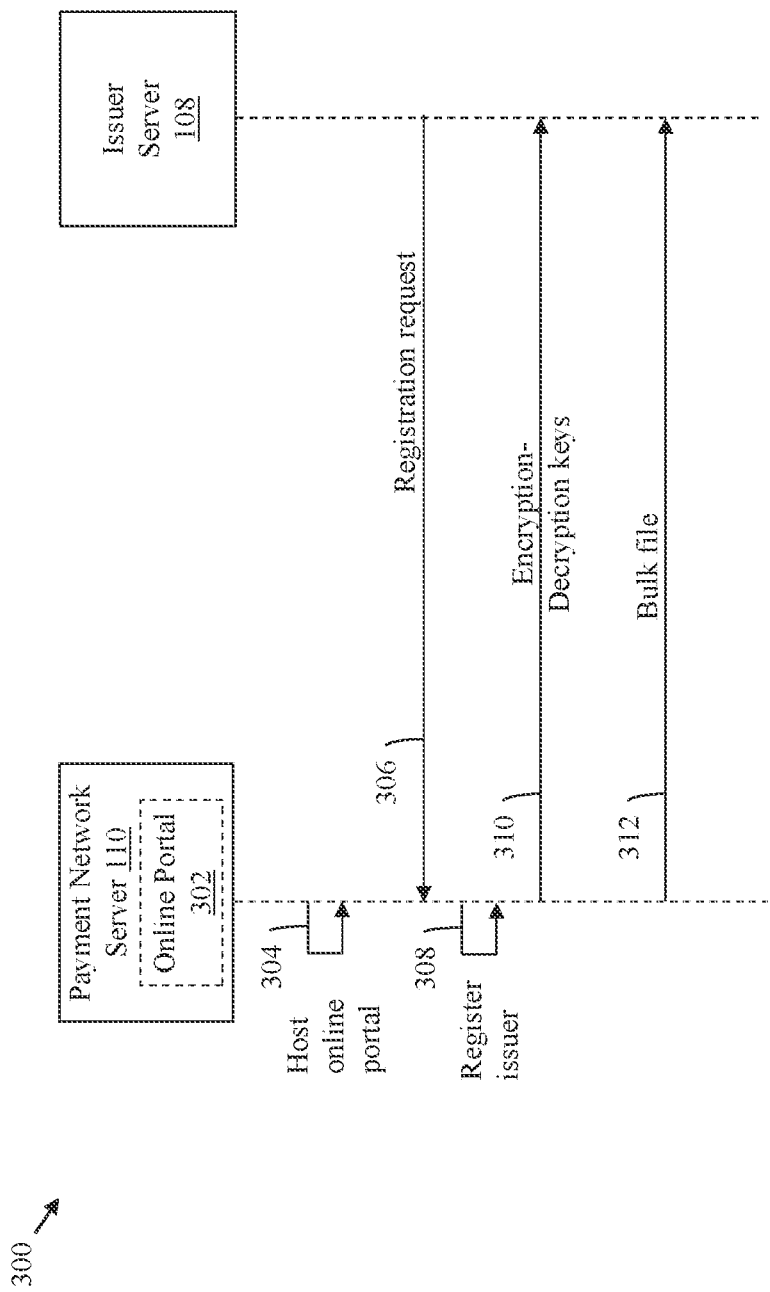
FIG. 3 represents a process flow diagram for enabling communication between a payment network server of FIG. 1 and an issuer server of FIG. 1, in accordance with an exemplary embodiment of the present disclosure.

FIG. 3 represents a process flow diagram 300 for enabling communication between the payment network server 110 and the issuer server 108, in accordance with an exemplary embodiment of the present disclosure. The process flow diagram 300 involves the issuer server 108 and the payment network server 110. The payment network server 110 hosts an online portal 302 (i.e., a second service application) for facilitating communication and exchange of information between the payment network server 110 and the issuer server 108 (as shown by arrow 304).

The issuer server 108 communicates a registration request to the payment network server 110 using the online portal 302 (as shown by arrow 306). The issuer server 108 may communicate the registration request for availing a transaction card procurement service offered by the payment network server 110. The registration request may be indicative of the second identifier of the issuer associated with the issuer server 108. Based on the received registration request, the payment network server 110 registers the issuer for the transaction card procurement service (as shown by arrow 308). The payment network server 110 then communicates the second set of encryption-decryption keys to the issuer server 108 through the online portal 302 (as shown by arrow 310). The payment network server 110 further communicates to the issuer server 108, a bulk file indicative of details of the plurality of transaction card dispensers, e.g., the first and second transaction card dispensers 106a and 106b (as shown by arrow 312). The details of the plurality of transaction card dispensers may include identifiers and geographical locations of the plurality of transaction card dispensers. The bulk file may be communicated periodically (e.g., daily, weekly, or the like) by the payment network server 110 to the issuer server 108 through the online portal 302. The periodic communication of the bulk file ensures that the issuer server 108 remains updated with regards to a status of the plurality of transaction card dispensers.

The issuer server 108 may further receive, by way of the online portal 302 from the payment network server 110, details of various newly dispensed transaction cards that are linked to the payment accounts maintained at the issuer server 108. Further, the issuer server 108 may file, by way of the online portal 302, dispute requests for disputes pertaining to the transaction cards dispensed by any of the plurality of transaction card dispensers. The payment network server 110 may facilitate resolution of the disputes pertaining to the dispute requests filed or lodged through the online portal 302.

FIG. 4 is a Table 400 that illustrates a first database maintained at the payment network server 110, in accordance with an exemplary embodiment of the present disclosure. Table 400 includes columns 402a-402e and rows 404a and 404b. Column 402a is indicative of identifiers of transaction card dispensers (i.e., the first and second transaction card dispensers 106a and 106b) that are in communication with the payment network server 110. Column 402b is indicative of a number of transaction cards loaded to or stored in each of the first and second transaction card dispensers 106a or 106b. Column 402c is indicative of a number of transaction cards already dispensed by each of the first and second transaction card dispensers 106a and 106b. Column 402d is indicative of a geographical location (e.g., pin code) of each of the first and second transaction card dispensers 106a or 106b. For the sake of brevity, the geographical location of each transaction card dispenser is denoted by a pin code that corresponds to a location of the transaction card dispenser. However, it will be apparent to those of skill in the art that, that geographical location of each transaction card dispenser may also be denoted by a street address, latitude and longitude co-ordinates of a location of the transaction card dispenser, or the like, without deviating from the scope of the disclosure. Column 402e is indicative of IIN ranges of the transaction cards loaded into each of the first and second transaction card dispensers 106a or 106b.

Row 404a indicates that the first identifier of the first transaction card dispenser 106a is '541210111'. Row 404a further indicates that '50' new transaction cards are stored in the first transaction card dispenser 106a and '4' transaction cards have been dispensed by the first transaction card dispenser 106a. Row 404a further indicates that the geographical location of the first transaction card dispenser 106a is 'pin code 10001'. Row 404a further indicates the IIN range '554328000001-554328000050' of the new transaction cards 116 stored in the first transaction card dispenser 106a.

Row 404b indicates that an identifier of the second transaction card dispenser 106b is '541210112'. Row 404b further indicates that '50' transaction cards are stored in the second transaction card dispenser 106b and '23' transaction cards have been dispensed by the second transaction card dispenser 106b. Row 404b further indicates that the geographical location of the second transaction card dispenser 106b is 'pin code 10005'. Row 404b further indicates the IIN range '554328000051-554328000100' of the plurality of new transaction cards 118a-118n stored in the second transaction card dispenser 106b.

Information stored in the first database, as illustrated by Table 400, is merely exemplary and is not meant to constrain the scope of the disclosure in any manner. It will be apparent to those of skill in the art that the payment network server 110 may store more information in Table 400 without deviating from the scope of the disclosure.

FIG. 5 is a Table 500 that illustrates information conveyed by the payment network server 110 to the issuer server 108, in accordance with an exemplary embodiment of the present disclosure. Table 500 includes columns 502a-502e and rows 504a-504d. Column 502a is indicative of identifiers of transaction card dispensers. Column 502b is indicative of a transaction card number of a new transaction card dispensed by corresponding transaction card dispenser. Column 502c is indicative of identifiers of issuers that are associated with each of the dispensed transaction cards. Column 502d is indicative of a date of procurement of each transaction card. Column 502e is indicative of an expiry date of each of the dispensed transaction cards.

Row 504a indicates the first identifier '541210111' of the first transaction card dispenser 106a that has dispensed the new transaction card 116a having the second transaction card number '554328000001'. Row 504a further indicates the second identifier (e.g., '1445') of the issuer that maintains the payment account linked to the new transaction card 116a, a date of procurement (e.g., '11-28-2019' or Nov. 28, 2019) of the new transaction card 116a, and the second expiry date of the new transaction card 116a (e.g., '02-28-2020' or Feb. 28, 2020).

Row 504b indicates the first identifier '541210111' of the first transaction card dispenser 106a that has dispensed another new transaction card (e.g., the new transaction card 116b) having a third transaction card number '554328000002'. The new transaction card 116b may be procured by a user (not shown) different from the user 102. Row 504b further indicates the second identifier (e.g., '1445') of the issuer that maintains a payment account linked to the new transaction card 116b, a date of procurement (e.g., '11-28-2019' or Nov. 28, 2019) of the new transaction card 116b, and a third expiry date of the new transaction card 116b (e.g., '02-28-2020' or Feb. 28, 2020).

Row 504c indicates the first identifier '541210111' of the first transaction card dispenser 106a that has dispensed a new transaction card (e.g., the new transaction card 116c) having a fourth transaction card number '554328000003'. The new transaction card 116c may be procured by a user (not shown) different from the user 102. Row 504c further indicates the second identifier (e.g., '1445') of the issuer that maintains a payment account linked to the new transaction card 116c, a date of procurement (e.g., '11-30-2019' or Nov. 30, 2019) of the new transaction card 116c, and a fourth expiry date of the new transaction card 116c (e.g., '03-01-2020' or Mar. 1, 2020).

Row 504d indicates the first identifier '541210111' of the first transaction card dispenser 106a that has dispensed a new transaction card (e.g., the new transaction card 116d) having a fifth transaction card number '554328000004'. The new transaction card 116d may be procured by a user (not shown) different from the user 102. Row 504d further indicates an identifier (e.g., '1332') of another issuer that maintains a payment account associated with the new transaction card 116d, a date of procurement (e.g., '11-30-2019' or Nov. 30, 2019) of the transaction card, and a fifth expiry date of the new transaction card 116d (e.g., '03-01-2020' or Mar. 1, 2020). In a non-limiting example, each of the second through fifth expiry dates are shown to be three months from a corresponding date of procurement.

For the sake of brevity, Table 500 is shown to include only information pertinent to transaction cards dispensed by the first transaction card dispenser 106a. It will be apparent to those of skill in the art that Table 500 may further include other pertinent information such as, but not limited to, a pre-paid balance loaded into each transaction card, a name of a user or cardholder that has procured each transaction card, or a time of procurement of each transaction card (e.g., an exact time instant at which each transaction card is procured). Table 500 may be communicated periodically (e.g., hourly, daily, or weekly) by the payment network server 110 to the issuer server 108 through the online portal 302 (shown in FIG. 3).

FIG. 6 is a Table 600 that illustrates a second database maintained at the issuer server 108, in accordance with an exemplary embodiment of the present disclosure. Table 600 includes columns 602a-602f and rows 604a-604c. Column 602a is indicative of the second identifier of the issuer. Column 602b is indicative of identifiers of transaction card dispensers that have dispensed transaction cards linked to the payment accounts maintained at the issuer server 108. Column 602c is indicative of transaction card numbers of various transaction cards that are dispensed by corresponding transaction card dispensers for payment accounts maintained at the issuer server 108. Column 602d is indicative of dates of procurement for the transaction cards. Column 602e is indicative of names of cardholders (i.e., users) associated with the dispensed transaction cards. Column 602f is indicative of disputed amounts associated with the dispensed transaction cards. The disputed amount associated with each transaction card may be a sum of transaction amounts of all disputes associated with the corresponding transaction card.

Row 604a indicates the second identifier (e.g., '1445') of the issuer. Row 604a further indicates the first identifier (e.g., '541210111') of the first transaction card dispenser 106a that has dispensed the new transaction card 116a having the second transaction card number '554328000001'. Row 604a further indicates that the date of procurement of the new transaction card 116a is '11-28-2019', a name of the user 102 is 'John Doe', and a disputed amount '$0' is associated with the new transaction card 116a.

Row 604b indicates the second identifier (e.g., '1445') of the issuer. Row 604b further indicates the first identifier (e.g., '541210111') of the first transaction card dispenser 106a that has dispensed the new transaction card 116b having the third transaction card number '554328000002'. Row 604b further indicates that the date of procurement of the new transaction card 116b is '11-28-2019', a name of a user or cardholder of the new transaction card 116b is 'Jane Doe', and a disputed amount '$65' is associated with the new transaction card 116b.

Row 604c indicates the second identifier (e.g., '1445') of the issuer. Row 604c further indicates the first identifier (e.g., '541210111') of the first transaction card dispenser 106a that has dispensed the new transaction card 116c having the fourth transaction card number (e.g., '554328000003'). Row 604c further indicates that the date of procurement of the new transaction card 116c is '11-30-2019', a name of a user or cardholder of the new transaction card 116c is 'John Lewis', and a disputed amount '$0' is associated with the new transaction card 116c.

For the sake of brevity, Table 600 is shown to include only information pertinent to transaction cards dispensed by the first transaction card dispenser 106a. It will be apparent to those of skill in the art that Table 600 may further include other pertinent information such as, but not limited to, a pre-paid balance loaded into each transaction card, an expiry date of each transaction card, details of one or more disputes associated with each transaction, the location of the first transaction card dispenser 106a, or the like.

Figure 7:
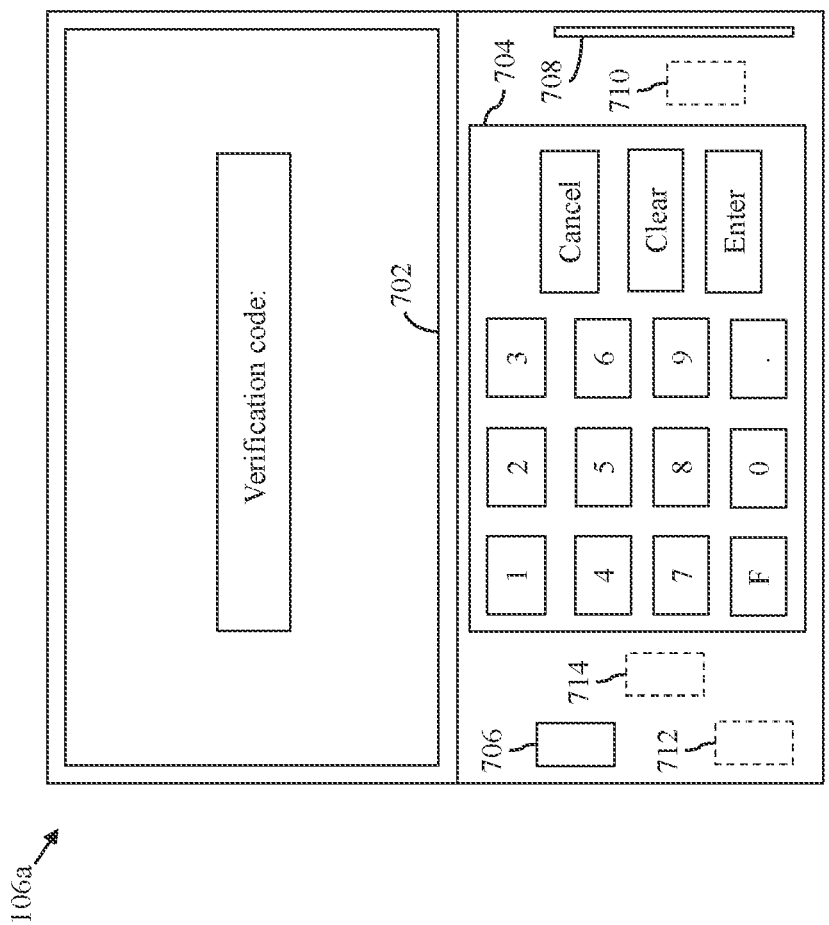
FIG. 7 is a block diagram that illustrates a transaction card dispenser of FIG. 1, in accordance with an embodiment of the present disclosure.

FIG. 7 is a block diagram that illustrates the first transaction card dispenser 106a, in accordance with an embodiment of the present disclosure. The first transaction card dispenser 106a may include suitable logic, circuitry, and/or interfaces that enable the first transaction card dispenser 106a to dispense the new transaction card 116a for the user 102. For example, as shown in FIG. 7, the first transaction card dispenser 106a may include a display 702, a keypad 704, a biometric scanner 706, a card dispensing section 708, and a corresponding inventory 710 for storing the new transaction cards 116. The first transaction card dispenser 106a may further include a first memory 712 and a first transceiver 714.

The display 702 renders a second UI that prompts the user 102 to provide the verification code to the first transaction card dispenser 106a. Examples of the display 702 may include, but are not limited to, Thin-Film-Transistor (TFT) Liquid-Crystal Display (LCD), an In-Plane Switching (IPS) LCD, a Resistive Touchscreen LCD, a Capacitive Touchscreen LCD, an Organic Light Emitting Diode (OLED) display, an Active-Matrix Organic Light-Emitting Diode (AMOLED) display, a Super AMOLED display, a Retina Display, or a Haptic/Tactile touchscreen-based display.

The keypad 704 may be an encrypted pin pad (EPP) that includes a set of alpha-numeric keys ('0'-'9', 'F', and '.') and a set of function defined keys (FDKs), such as 'Cancel', 'Clear', and 'Enter'. The biometric scanner 706 may be a fingerprint scanner (e.g., an optical or ultrasonic scanner) that enables scanning of the fingerprint of the user 102. The card dispensing section 708 dispenses the new transaction cards 116 that are stored in the inventory 710.

The first memory 712 may be configured to store therein various card dispensing requests received from the payment network server 110. Each card dispensing request may be accessed by way of a unique verification code associated with the corresponding card dispensing request. Further, each card dispensing request may be indicative of a pre-paid balance that is to be loaded in a new transaction card that is to be dispensed. Examples of the first memory 712 may include a random-access memory (RAM), a read-only memory (ROM), a removable storage drive, a hard disk drive (HDD), a flash memory, a solid-state memory, and the like.

The first transceiver 714 may include suitable logic, circuitry, interfaces, and/or code, executable by the circuitry, to transmit and receive data over the communication network 112 using one or more communication network protocols. The first transceiver 714 may transmit requests and messages to and receive requests and messages from one of the payment network server 110 or the issuer server 108. Examples of the first transceiver 714 may include, but are not limited to, an antenna, a radio frequency transceiver, a wireless transceiver, a Bluetooth transceiver, an ethernet port, a universal serial bus (USB) port, or any other device configured to transmit and receive data.

The user 102 may provide the verification code to the first transaction card dispenser 106*a* using the keypad 704. When the card dispensing request is accessed from the first memory 712 using the verification code, the first transaction card dispenser 106*a* determines that the verification code provided by the user 102 is successfully verified. Upon successful verification of the verification code, the card dispensing section 708 dispenses the new transaction card 116*a* that is loaded with the pre-paid balance specified to the user 102.

In one embodiment, the first transaction card dispenser 106*a*, by way of the second UI, may further prompt the user 102 to provide the authentication data (i.e., provide the fingerprint scan of the user 102). The user 102 may provide the authentication data (i.e., provide the fingerprint scan) using the biometric scanner 706. In such a scenario, the card dispensing section 708 dispenses the new transaction card 116*a* when the biometric data is successfully verified.

FIGS. 8A-8C, collectively represent an exemplary scenario 800 that illustrates UI screens 802-818 that are rendered on the user device 104 for facilitating transaction card procurement, in accordance with an embodiment of the present disclosure. FIGS. 8A-8C are explained in conjunction with FIGS. 2A-2F. In various embodiments, the UI screens 802-818 may be displayed on the display of the user device 104 by the first service application 114.

With reference to FIG. 8A, when the user 102 accesses the first service application 114, the UI screen 802 may be rendered on the display of the user device 104. The UI screen 802 may request the user 102 to enter a username and a password to log into the first service application 114. The user 102 may enter the username and the password in first and second text boxes 820 and 822, respectively. After entering the username and the password, the user 102 may select a first submit button 824 for logging into the first service application 114. The user device 104 may communicate an authentication request to the issuer server 108 for authentication of the user 102. The authentication request may include the entered username and password. The issuer server 108 may authenticate the user 102 and communicate an authentication response to the user device 104. If the authentication response indicates that the user 102 is successfully authenticated, control may be redirected to the UI screen 804.

The UI screen 804 may present first through fourth user-selectable options 826-832 for viewing an account summary of the payment account, transferring funds from the payment account, blocking a transaction card, and procuring a new temporary transaction card, respectively. Due to the loss of the first transaction card, the user 102 may select the third user-selectable option 830 for blocking the first transaction card. Upon selection of the third user-selectable option 830, control may be redirected to the UI screen 806. The UI screen 806 may present a message requesting the user 102 to select a transaction card that the user 102 wants to block. For example, as shown in FIG. 8A, the UI screen 806 presents the active first transaction card 834 of the user 102. The user 102 may select the first transaction card 834 for blocking. The UI screen 806 may further present a message requesting the user 102 to select a reason for blocking the transaction card. The user 102 may select one of the reasons from a drop-down list 836. As shown in FIG. 8A, the user 102 has selected 'Card Lost' as the reason for blocking the selected first transaction card 834. Consequently, the user device 104 communicates the card block request to the issuer server 108. The card block request indicates the selection of the first transaction card 834 for blocking. The issuer server 108 then blocks the first transaction card based on the card block request. On blocking the first transaction card, the issuer server 108 communicates the card block response to the user device 104. Based on the card block response, control may be redirected to the UI screen 808. The UI screen 808 may notify the user 102 of a successful blocking of the first transaction card. Control is then again redirected to the UI screen 804 as shown in FIG. 8B.

With reference to FIG. 8B, the user 102 may select the fourth user-selectable option 832 presented on the UI screen 804 for initiating the card procurement request. The user 102 may initiate the card procurement request to procure a new transaction card linked to the payment account. The first transaction card may be required to be blocked prior to the selection of the fourth user-selectable option 832. In one embodiment, the fourth user-selectable option 832 may be inactive (i.e., not available for selection) if the first transaction card is not blocked. Upon the selection of the fourth user-selectable option 832, control may be redirected to the UI screen 810.

The UI screen 810 may present a message, requesting the user 102 to enter the first distance (i.e., a preferred distance) for retrieving the list of the transaction card dispensers. The user 102 may enter the first distance (e.g., '5 Km') in a fifth text box 838 presented on the UI screen 810. The user 102 may select a third submit button 840 for submitting the first distance. Consequently, the user device 104 communicates the retrieval request, indicative of the first distance and the detected geographical location of the user 102, to the payment network server 110 via the issuer server 108. For the sake of brevity, it is assumed that the first service application 114 automatically detects the geographical location by way of the GPS installed in the user device 104. In another embodiment, the user 102 may manually provide the geographical location in the first service application 114. As described in the foregoing description of FIGS. 2A-2F, the payment network server 110 communicates the retrieval response to the user device 104 via the issuer server 108. Following the reception of the retrieval response, control may be redirected to the UI screen 812.

The UI screen 812 may present, for selection by the user 102, the list of the transaction card dispensers located within the first distance of the detected geographical location. For the sake of brevity, the list is shown to include only two transaction card dispensers, i.e., the first and second transaction card dispensers 106a and 106b. The UI screen 812 may present fifth and sixth user-selectable options 842 and 844, indicative of the first transaction card dispenser 106a and the second transaction card dispenser 106b, respectively. The user 102 may select the fifth user-selectable option 842 based on the proximity of the first transaction card dispenser 106a. The user device 104 then communicates, to the payment network server 110 via the issuer server 108, the card procurement request. The card procurement request is indicative of the selection of the fifth user-selectable option 842 by the user 102. As described in the foregoing description of FIGS. 2A-2F, the payment network server 110 communicates the verification code to the user device 104 via the issuer server 108, and the control is then redirected to the UI screen 814. The UI screen 814 presents a message notifying the user 102 of the verification code (e.g., '121289893712'). The received verification code is used by the user 102 at the first transaction card dispenser 106a for procuring the new transaction card 116a. When the first transaction card dispenser 106a dispenses the new transaction card 116a, control is redirected to the UI screen 816 as shown in FIG. 8C. The new transaction card 116a dispensed by the first transaction card dispenser 106a may be inactive.

With reference FIG. 8C, the UI screen 816 may present a seventh user-selectable option 846, to the user 102, for activating the new transaction card 116a for use. The user 102 may select the seventh user-selectable option 846 for initiating the activation request. The user device 104 communicates the activation request, indicating the selection of the seventh user-selectable option 846, to the issuer server 108. Consequently, the issuer server 108 activates the new transaction card 116a for use. The issuer server 108 communicates the activation response, indicative of the activation of the new transaction card 116a, to the user device 104. Control may then be redirected to the UI screen 818. The UI screen 818 may present the notification indicating the activation of the new transaction card 116a. The UI screen 818 may further present eighth and ninth user-selectable options 848 and 850, respectively. The eighth user-selectable option 848 may allow the user 102 to view the pre-paid balance loaded into the new transaction card 116a. The ninth user-selectable option 850 may allow the user 102 to load an additional pre-paid balance (i.e., add funds) from the linked payment account into the new transaction card 116a or transfer a remaining pre-paid balance to the linked payment account. For example, when the user 102 receives a new permanent transaction card issued by the issuer upon blocking of the previous transaction card, the user 102 may transfer the remaining pre-paid balance from the new transaction card 116a to the payment account and discard the new transaction card 116a. In another scenario, the user 102 may continue to use the new transaction card 116a until expiry, even after the new permanent transaction card is received by the user 102.

FIG. 9 is a block diagram that illustrates the payment network server 110, in accordance with an exemplary embodiment of the present disclosure. The payment network server 110 may include processing circuitry 902, a second memory 904 of the payment network server 110, and a second transceiver 906. The processing circuitry 902, the second memory 904, and the second transceiver 906 may communicate with each other by way of a communication bus 908. The processing circuitry 902 may include a portal host 910, a cryptography engine 912, and a card procurement engine 914.

The processing circuitry 902 may include suitable logic, circuitry, interfaces, and/or code, executed by the circuitry, to facilitate quick and easy transaction card procurement. The processing circuitry 902 may be configured to receive card procurement requests, identify transaction card dispensers associated with the received card procurement requests, and communicate with corresponding issuers and the identified transaction card dispensers to facilitate transaction card procurement for users (e.g., the user 102). Examples of the processing circuitry 902 may include, but are not limited to, an application-specific integrated circuit (ASIC) processor, a reduced instruction set computer (RISC) processor, a complex instruction set computer (CISC) processor, a field programmable gate array (FPGA), and the like. The processing circuitry 902 executes various operations for facilitating transaction card procurement by way of the portal host 910, the cryptography engine 912, and the card procurement engine 914.

The second memory 904 may include suitable logic, circuitry, interfaces, and/or code, executable by the circuitry, to store information (e.g., Tables 400 and 500) pertaining to the plurality of transaction card dispensers associated with the payment network, transaction cards dispensed by the plurality of transaction card dispensers, disputes pertaining to the dispensed transaction cards, or the like. Examples of the second memory 904 may include a RAM, a ROM, a removable storage drive, an HDD, a flash memory, a solid-state memory, and the like. It will be apparent to a person skilled in the art that the scope of the disclosure is not limited to realizing the second memory 904 in the payment network server 110, as described herein. In another embodiment, the second memory 904 may be realized in form of a database server or a cloud storage working in conjunction with the payment network server 110, without departing from the scope of the disclosure.

The portal host 910 may be configured to host the online portal 302 (as shown in FIG. 3) that facilitates communication between the payment network server 110 and the issuer server 108. The portal host 910 communicates, to the issuer server 108, the information (e.g., Table 500) pertaining to transaction cards dispensed by the plurality of transaction card dispensers associated with the payment network via the online portal 302. The portal host 910 may receive, from the issuer server 108 by way of the online portal 302, transactional disputes lodged by the issuer server 108 for the transaction cards dispensed by the plurality of transaction card dispensers, e.g., the first and second transaction card dispensers 106a and 106b. The portal host 910 may facilitate management and resolution of the dispute requests filed or lodged by the issuer server 108.

The cryptography engine 912 may ensure security of communications between the payment network server 110 and the issuer server 108 or the plurality of transaction card dispensers (e.g., the first transaction card dispenser 106a). The cryptography engine 912 may generate and communicate to the issuer server 108 and/or the first transaction card dispenser 106a, encryption and decryption keys (e.g., the first and second sets of encryption-decryption keys) for encrypting and/or decrypting communication messages (e.g., the verification code, the verification request, the verification response, or the like). The cryptography engine 912 may further encrypt data (e.g., Table 400) stored by the payment network server 110.

The card procurement engine 914 may communicate with the issuer server 108 and the first transaction card dispenser 106a to facilitate transaction card procurement. For example, the card procurement engine 914 may identify the first transaction card dispenser 106a based on the card procurement request and verify connectivity between the payment network server 110 and the first transaction card dispenser 106a. The card procurement engine 914 may further communicate the card dispensing request to the first transaction card dispenser 106a for ensuring the availability of the first transaction card dispenser 106a. Further, the card procurement engine 914 may generate the verification code and communicate the verification code to the first transaction card dispenser 106a and the user device 104. Further, the card procurement engine 914 may store the details of the new transaction card 116a in the second memory 904 based on the first notification communicated by the first transaction card dispenser 106a. The card procurement engine 914 may manage Tables 400 and 500 stored in the second memory 904.

The second transceiver 906 may include suitable logic, circuitry, interfaces, and/or code, executable by the circuitry, to transmit and receive data over the communication network 112 using one or more communication network protocols. The second transceiver 906 may transmit requests and messages to and receive requests and messages from the issuer server 108 and the first transaction card dispenser 106a. Examples of the second transceiver 906 may include, but are not limited to, an antenna, a radio frequency transceiver, a wireless transceiver, a Bluetooth transceiver, an ethernet port, a USB port, or any other device configured to transmit and receive data.

FIG. 10 is a block diagram that illustrates a system architecture of a computer system 1000, in accordance with an exemplary embodiment of the disclosure. An embodiment of disclosure, or portions thereof, may be implemented as computer readable code on the computer system 1000. In one example, the user device 104, the first transaction card dispenser 106a, the issuer server 108, and the payment network server 110 may be implemented as the computer system 1000.

Hardware, software, or any combination thereof may embody modules and components used to implement methods of FIGS. 11A-11C and 12. The computer system 1000 includes a processor 1002 that may be a special-purpose or a general-purpose processing device. The processor 1002 may be a single processor, multiple processors, or combinations thereof. Further, the processor 1002 may be connected to a communication infrastructure 1004, such as a bus, message queue, multi-core message-passing scheme, and the like. The computer system 1000 may further include a main memory 1006 and a secondary memory 1008. Examples of the main memory 1006 may include a RAM, a ROM, and the like. The secondary memory 1008 may include an HDD or a removable storage drive, such as a floppy disk drive, a magnetic tape drive, a compact disc, an optical disk drive, a flash memory, and the like.

The computer system 1000 further includes an input/output (I/O) interface 1010 and a communication interface 1012. The I/O interface 1010 includes various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communication port, and the like. Data transferred via the communication interface 1012 may correspond to signals, such as electronic, electromagnetic, optical, or other signals as will be apparent to a person skilled in the art.

FIGS. 11A-11C, collectively represent a flow chart 1100 that illustrates a method for facilitating transaction card procurement, in accordance with an exemplary embodiment of the present disclosure.

At step 1102, the payment network server 110 receives a geographical location of the user 102 from the issuer server 108. The current geographical location may be included in the retrieval request. Based on the received geographical location, the payment network server 110 retrieves the list of the transaction card dispensers that are within the first distance of the current geographical location of the user 102. The process proceeds to step 1104. At step 1104, the payment network server 110 communicates the list of the transaction card dispensers to the user device 104 via the issuer server 108 for user selection. The process proceeds to step 1106. At step 1106, the payment network server 110 receives the card procurement request from the issuer server 108 for procuring a new transaction card linked to the payment account of the user 102, as described in the foregoing description of FIG. 2B. The card procurement request may be indicative of an identifier (e.g., the first identifier) of a transaction card dispenser (e.g., the first transaction card dispenser 106a) selected by the user 102 from the list for procuring the new transaction card. The card procurement request may be initiated by the user 102 by way of the user device 104. The process proceeds to step 1108. At step 1108, the payment network server 110 communicates a connectivity request to the selected first transaction card dispenser 106a for verifying the connectivity between the payment network server 110 and the first transaction card dispenser 106a. The process proceeds to step 1110. At step 1110, the payment network server 110 receives a connectivity response from the first transaction card dispenser 106a. The process proceeds to step 1112. At step 1112, the payment network server 110 verifies the connectivity between the payment network server 110 and the first transaction card dispenser 106a based on the connectivity response. The process proceeds to step 1114. At step 1114, the payment network server 110 determines whether the connectivity is adequate. If at step 1114, the payment network server 110 determines that the connectivity is inadequate, the process stops and the user 102 is prompted to select another transaction card dispenser for transaction card procurement. However, if at step 1114, the payment network server 110 determines that the connectivity is adequate, the process proceeds to step 1116.

At step 1116, the payment network server 110 dynamically generates a set of encryption-decryption keys (e.g., the first set of encryption-decryption keys). The process proceeds to step 1118. At step 1118, the payment network server 110 communicates the generated set of encryption-decryption keys to the selected first transaction card dispenser 106a. The process proceeds to step 1120. At step 1120, the payment network server 110 communicates a card dispensing request, including the verification code, to the first transaction card dispenser 106a. The payment network server 110 communicates the card dispensing request for confirming an availability of the first transaction card dispenser 106a to dispense the new transaction card. The card dispensing request may be encrypted (as shown in FIG. 2C). The process proceeds to step 1122.

At step 1122, the payment network server 110 receives an approval for the card dispensing request from the first transaction card dispenser 106a. The approval indicates that the first transaction card dispenser 106a is available for dispensing the new transaction card. The process proceeds to step 1124. At step 1124, the payment network server 110 communicates the verification code to the issuer server 108. The verification code may be in the encrypted format. The verification code may be further communicated to the user device 104 and used by the user 102 at the first transaction card dispenser 106a for procuring the new transaction card. The process proceeds to step 1126. At step 1126, the payment network server 110 receives a verification request from the first transaction card dispenser 106a when the user 102 attempts to procure the new transaction card from the first transaction card dispenser 106a. The verification request may be indicative of the authentication data provided by the user 102. The process proceeds to step 1128.

At step 1128, the payment network server 110 communicates the verification request to the issuer server 108. The process proceeds to step 1130. At step 1130, the payment network server 110 receives the verification response from the issuer server 108 following the verification of the authentication data by the issuer server 108. The process proceeds to step 1132. At step 1132, the payment network server 110 communicates the verification response to the first transaction card dispenser 106a. Based on the successful verification of the verification code at the first transaction card dispenser 106a and the received verification response, the first transaction card dispenser 106a dispenses the new transaction card 116a for the user 102. The process proceeds to step 1134. At step 1134, the payment network server 110 receives the first notification, indicative of the details of the new transaction card 116a, from the first transaction card dispenser 106a. The process proceeds to step 1136. At step 1136, the payment network server 110 stores the details of the new transaction card 116a in the second memory 904. The process proceeds to step 1138. At step 1138, the payment network server 110 communicates to the issuer server 108, the details of the new transaction card 116a, the time of procurement of the dispensed transaction card 116a, and the first identifier of the first transaction card dispenser 106a.

FIG. 12 represents a high-level flow chart 1200 that illustrates a method for facilitating transaction card procurement, in accordance with an exemplary embodiment of the present disclosure. At step 1202, a server (e.g., the payment network server 110) receives a card procurement request for procuring a new transaction card that is linked to the payment account of the user 102. The card procurement request is initiated by way of the user device 104 of the user 102 and includes the first identifier of the first transaction card dispenser 106a that is selected for the procurement of the new transaction card. The process proceeds to step 1204. At step 1204, the server (e.g., the payment network server 110) communicates a card dispensing request to the first transaction card dispenser 106a for confirming an availability of the first transaction card dispenser 106a to dispense the new transaction card. The process proceeds to step 1206. At step 1206, the server (e.g., the payment network server 110) receives, from the first transaction card dispenser 106a, the approval for the card dispensing request. The process proceeds to step 1208. At step 1208, based on the received approval, the server (e.g., the payment network server 110) communicates to the user device 104, the verification code that is to be used at the first transaction card dispenser 106a for procuring the new transaction card. The verification code is provided by the user 102 to the first transaction card dispenser 106a, and following a successful verification of the verification code, the new transaction card 116a is dispensed by the first transaction card dispenser 106a for the user 102.

Thus, the environment 100 offers a convenient means for facilitating transaction card procurement. The payment network server 110 or the issuer server 108 may be associated with the plurality of transaction card dispensers (e.g., the first and second transaction card dispensers 106a and 106b) each storing a plurality of new transaction cards (e.g., the new transaction cards 116) for dispensing. Technological improvements in the payment network server 110 (or the issuer server 108) enable the payment network server 110 to provide the transaction card procurement service. Users (e.g., the user 102) may initiate card procurement requests for procuring new temporary transaction cards (e.g., the new transaction card 116a) upon loss of old transaction cards (e.g., the first transaction card). The first service application 114 hosted by the issuer server 108 enables quick blocking of the old transaction cards (e.g., the first transaction card) prior to initiating the card procurement requests for the new transaction cards. The payment network server 110 facilitates fast dispensation of the new transaction cards as per user requirement. All communication between the payment network server 110, the issuer server 108, and the plurality of transaction card dispensers is encrypted, ensuring a high degree of security for financial data of the user 102. Further, the new transaction cards are dispensed only after verification of corresponding verification codes, thus, drastically reducing likelihood of fraud. The new transaction cards are typically pre-paid transaction cards, eliminating elements of risk associated with issuing debit and/or credit transaction cards. Entities, such as payment networks and issuers, may charge the user 102 a nominal fee for facilitating transaction card procurement, thus, improving business, profits, and revenues for the entities. Rapid blocking of the old transaction cards and dispensing of the new transaction cards will ensure higher levels of satisfaction for the users.

Techniques consistent with the present disclosure provide, among other features, systems and methods for facilitating transaction card procurement. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for facilitating transaction card procurement, the method comprising:

receiving, by a server from a user device of a user, a card procurement request for procuring a new transaction card that is linked to a payment account of the user, wherein the card procurement request is initiated through an application installed on the user device of the user and includes a first identifier of a first transaction card dispenser that is selected for the procurement of the new transaction card;

communicating, by the server to the first transaction card dispenser, a card dispensing request for confirming an availability of the first transaction card dispenser to dispense the new transaction card, the card dispensing request including a verification code specific to the card procurement request for the new transaction card;

receiving, by the server from the first transaction card dispenser, an approval for the card dispensing request indicating the first transaction card dispenser is available to dispense the new transaction card;

receiving, by the server from the first transaction card dispenser, a user verification request including authentication data of the user, the authentication data including biometric data of the user captured by the first transaction card dispenser;

comparing the biometric data of the user received in the user verification request with stored biometric data of the user;

communicating, by the server to the first transaction card dispenser, a user verification response based on the comparison of the biometric data of the user received in the user verification request with the stored biometric data of the user; and communicating, by the server to the user device, based on the received approval, a user verification code for use at the first transaction card dispenser for procuring the new transaction card, whereby the new transaction card is dispensed by the first transaction card dispenser for the user in response to a successful verification at the first transaction card dispenser between the user verification code and the verification code specific to the card procurement request, and the user verification response indicating a successful verification between the biometric data of the user received in the user verification request and the stored biometric data of the user.

2. The method of claim 1, wherein the server is a payment network server of a payment network.

3. The method of claim 1, wherein the card procurement request is initiated following a blocking of an old transaction card associated with the payment account.

4. The method of claim 1, further comprising:
receiving, by the server, a geographical location of the user; and
communicating, by the server, to the user device for selection, a list including one or more transaction card dispensers that are within a first distance of the received geographical location, wherein the one or more transaction card dispensers includes the first transaction card dispenser.

5. The method of claim 1, wherein the new transaction card is a pre-paid card, and wherein the card procurement request is indicative of a pre-paid balance that is to be deducted from the payment account and loaded into the new transaction card.

6. The method of claim 1, wherein the card procurement request further includes a second identifier of an issuer that is associated with the payment account, and wherein the card dispensing request is indicative of the verification code and a pre-paid balance that is to be loaded into the new transaction card.

7. The method of claim 6, further comprising:
receiving, by the server, from the first transaction card dispenser, a notification indicative of the dispensing of the new transaction card by the first transaction card dispenser, wherein the notification includes one or more details of the new transaction card, and wherein the one or more details of the new transaction card includes at least one of a transaction card number of the new transaction card, an expiry date of the new transaction card, and the pre-paid balance associated with the new transaction card;
storing, by the server in a database, the one or more details of the new transaction card, wherein the one or more details of the new transaction card are stored in association with the second identifier of the issuer; and
communicating, by the server, to the issuer, the one or more details of the new transaction card, a time of procurement of the new transaction card from the first transaction card dispenser, and the first identifier of the first transaction card dispenser.

8. The method of claim 7, further comprising hosting, by the server, an online portal for communicating with the issuer, wherein the one or more details of the new transaction card, the time of procurement, and the first identifier are communicated to the issuer through the online portal.

9. The method of claim 1, wherein the biometric data of the user includes at least one of a fingerprint scan, a face scan, and a retina scan.

10. The method of claim 1, wherein the new transaction card is inactive when dispensed by the first transaction card dispenser, and wherein the new transaction card is activated by way of the user device of the user.

11. A system for facilitating transaction card procurement, the system comprising:
a payment network server configured to:
receive, from a user device of a user, a card procurement request for procuring a new transaction card that is linked to a payment account of the user, wherein the card procurement request is initiated through an application installed on the user device of the user and includes a first identifier of a first transaction card dispenser that is selected for the procurement of the new transaction card;
communicate to the first transaction card dispenser, a card dispensing request for confirming an availability of the first transaction card dispenser to dispense the new transaction card, the card dispensing request including a verification code specific to the card procurement request for the new transaction card;
receive from the first transaction card dispenser, an approval for the card dispensing request indicating the first transaction card dispenser is available to dispense the new transaction card; and receive from the first transaction card dispenser, a user verification request including authentication data of the user, the authentication data including biometric data of the user captured by the first transaction card dispenser;
compare the biometric data of the user received in the user verification request with stored biometric data of the user;
communicate to the first transaction card dispenser, a user verification response based on the comparison of the biometric data of the user received in the user verification request with the stored biometric data of the user; and
communicate to the user device, based on the received approval, a user verification code for use at the first transaction card dispenser for procuring the new transaction card, whereby the new transaction card is dispensed by the first transaction card dispenser for the user in response to a successful verification at the first transaction card dispenser between the user verification code and the verification code specific to the card procurement request, and the user verification response indicating a successful verification between the biometric data of the user received in the user verification request and the stored biometric data of the user.

12. The system of claim 11, wherein the card procurement request is initiated following a blocking of an old transaction card associated with the payment account.

13. The system of claim 11, wherein the payment network server is further configured to:
receive a geographical location of the user; and
communicate to the user device, a list including one or more transaction card dispensers that are within a first distance of the received geographical location, wherein the one or more transaction card dispensers include the first transaction card dispenser.

14. The system of claim 11, wherein the new transaction card is a pre-paid card, and wherein the card procurement request is indicative of a pre-paid balance that is to be deducted from the payment account and loaded into the new transaction card.

15. The system of claim 11, wherein the card procurement request includes a second identifier of an issuer that is associated with the payment account, and wherein the card dispensing request is indicative of the verification code and a pre-paid balance that is to be loaded into the new transaction card.

16. The system of claim 15, wherein the payment network server is further configured to:
receive, from the first transaction card dispenser, a notification indicative of the dispensing of the new transaction card by the first transaction card dispenser, wherein the notification includes one or more details of the new transaction card, and wherein the one or more details of the new transaction card include at least one of a transaction card number of the new transaction card, an expiry date of the new transaction card, and the pre-paid balance associated with the new transaction card;
store the one or more details of the new transaction card in a database, wherein the one or more details of the new transaction card are stored in association with the second identifier of the issuer; and
communicate to the issuer, the one or more details of the new transaction card, a time of procurement of the new transaction card from the first transaction card dispenser, and the first identifier of the first transaction card dispenser.

17. The system of claim 16, wherein the payment network server is further configured to host an online portal for communicating with the issuer, wherein the one or more details of the new transaction card, the time of procurement, and the first identifier are communicated to the issuer through the online portal.

18. The system of claim 11, wherein the biometric data of the user includes at least one of a fingerprint scan, a face scan, and a retina scan.

19. The system of claim 11, wherein the new transaction card is inactive when dispensed by the first transaction card dispenser, and wherein the new transaction card is activated by way of the user device of the user.

20. A system for facilitating transaction card procurement, the system comprising:
one or more transaction card dispensers each configured to store a plurality of transaction cards therein; and
a server configured to:
receive from a user device of a user a card procurement request for procuring a new transaction card that is linked to a payment account of the user, wherein the card procurement request is initiated through an application installed on the user device of the user and includes a first identifier of a first transaction card dispenser that is selected from the one or more transaction card dispensers for the procurement of the new transaction card;
communicate to the first transaction card dispenser, a card dispensing request for confirming an availability of the first transaction card dispenser to dispense the new transaction card, the card dispensing request including a verification code specific to the card procurement request for the new transaction card;
receive from the first transaction card dispenser, an approval for the card dispensing request indicating the first transaction card dispenser is available to dispense the new transaction card; and
receive from the first transaction card dispenser, a user verification request including authentication data of the user, the authentication data including biometric data of the user captured by the first transaction card dispenser;
compare the biometric data of the user received in the user verification request with stored biometric data of the user;
communicate to the first transaction card dispenser, a user verification response based on the comparison of the biometric data of the user received in the user verification request with the stored biometric data of the user; and
communicate to the user device, based on the received approval, a user verification code for use at the first transaction card dispenser for procuring the new transaction card, and wherein the first transaction card dispenser is configured to:
receive the user verification code provided by the user; and
dispense the new transaction card of the plurality of transaction cards for the user, in response to a successful verification at the first transaction card dispenser between the user verification code and the verification code specific to the card procurement request, and the user verification response indicating a successful verification between the biometric data of the user received in the user verification request and the stored biometric data of the user.

* * * * *